(12) United States Patent
Guo et al.

(10) Patent No.: US 11,025,374 B2
(45) Date of Patent: Jun. 1, 2021

(54) METHODS AND APPARATUS FOR RESOURCE ALLOCATION AND FEEDBACK IN VEHICLE TO VEHICLE COMMUNICATION

(71) Applicant: Samsung Electronics Co., Ltd., Suwon-si (KR)

(72) Inventors: Li Guo, Allen, TX (US); Chang-Sik Choi, Austin, TX (US); Le Liu, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 16/053,684

(22) Filed: Aug. 2, 2018

(65) Prior Publication Data

US 2019/0044667 A1 Feb. 7, 2019

Related U.S. Application Data

(60) Provisional application No. 62/541,234, filed on Aug. 4, 2017, provisional application No. 62/556,609, filed
(Continued)

(51) Int. Cl.
*H04W 4/46* (2018.01)
*H04L 1/18* (2006.01)

(52) U.S. Cl.
CPC .......... *H04L 1/1893* (2013.01); *H04L 1/1816* (2013.01); *H04L 1/1822* (2013.01); *H04W 4/46* (2018.02)

(58) Field of Classification Search
None
See application file for complete search history.

(56) References Cited

U.S. PATENT DOCUMENTS

2008/0225966 A1 9/2008 Tseng et al.
2016/0095133 A1\* 3/2016 Hwang ................. H04W 8/005
370/329
(Continued)

FOREIGN PATENT DOCUMENTS

EP 3110052 A1 12/2016
WO 2016/164084 A1 10/2016

OTHER PUBLICATIONS

LG Electronics, "Remaining issues on SCI contents", 3GPP TSG RAN WG1 Meeting #86, Aug. 22-26, 2016, R1-166831, 3 pages.
(Continued)

*Primary Examiner* — Ruihua Zhang

(57) ABSTRACT

A user equipment (UE) includes a controller configured to identify a pool of HARQ process numbers that is configured by a base station for transmission on a sidelink channel, search one or more a scheduling assignments of one or more other UEs to determine whether any of the HARQ process numbers are being used by other UEs, exclude HARQ process numbers that are being used from the configured pool of HARQ process numbers, select a HARQ process number from the remaining HARQ process numbers in the configured pool, generate a SCI to include the selected HARQ process number. The UE further includes a transmitter configured to perform a transmission or re-transmission of a packet over a sidelink to another UE(s), using the selected HARQ process number. Methods and apparatus for multi-beam based transmission for the sidelink and V2X communication are also disclosed.

20 Claims, 24 Drawing Sheets

Related U.S. Application Data on Sep. 11, 2017, provisional application No. 62/559,305, filed on Sep. 15, 2017, provisional application No. 62/684,358, filed on Jun. 13, 2018.

(56) References Cited

U.S. PATENT DOCUMENTS

| | | |
|---|---|---|
| 2016/0128082 A1 | 5/2016 | Chen et al. |
| 2017/0127405 A1 | 5/2017 | Agiwal et al. |
| 2017/0207885 A1 | 7/2017 | Lee et al. |
| 2017/0215183 A1 | 7/2017 | Gulati et al. |

OTHER PUBLICATIONS

Supplementary European Search Report dated Mar. 19, 2020 in connection with European Patent Application No. 18 84 0903, 9 pages.
"3rd Generation Partnership Project; Technical Specification Group Radio Access Network; Evolved Universal Terrestrial Radio Access (E-UTRA); Physical Channels and Modulation (Release 14)," 3GPP TS 36.211, V14.2.0, Mar. 2017, 194 pages.
"3rd Generation Partnership Project; Technical Specification Group Radio Access Network; Evolved Universal Terrestrial Radio Access (E-UTRA); Multiplexing and Channel Coding (Release 14)," 3GPP TS 36.212, V14.2.0, Mar. 2017, 197 pages.
"3rd Generation Partnership Project; Technical Specification Group Radio Access Network; Evolved Universal Terrestrial Radio Access (E-UTRA); Physical Layer Procedures (Release 14)," 3GPP TS 36.213, V14.2.0, Mar. 2017, 454 pages.
"3rd Generation Partnership Project; Technical Specification Group Radio Access Network; Evolved Universal Terrestrial Radio Access (E-UTRA); Medium Access Control (MAC) Protocol Specification (Release 14)," 3GPP TS 36.321, V14.2.0, Mar. 2017, 106 pages.
"3rd Generation Partnership Project; Technical Specification Group Radio Access Network; Evolved Universal Terrestrial Radio Access (E-UTRA); Radio Resource Control (RRC) Protocol Specification (Release 14)," 3GPP TS 36.331, V14.2.1, Mar. 2017, 721 pages.
International Search Report dated Nov. 5, 2018 in connection with International Patent Application No. PCT/KR2018/008912, 4 pages.

* cited by examiner

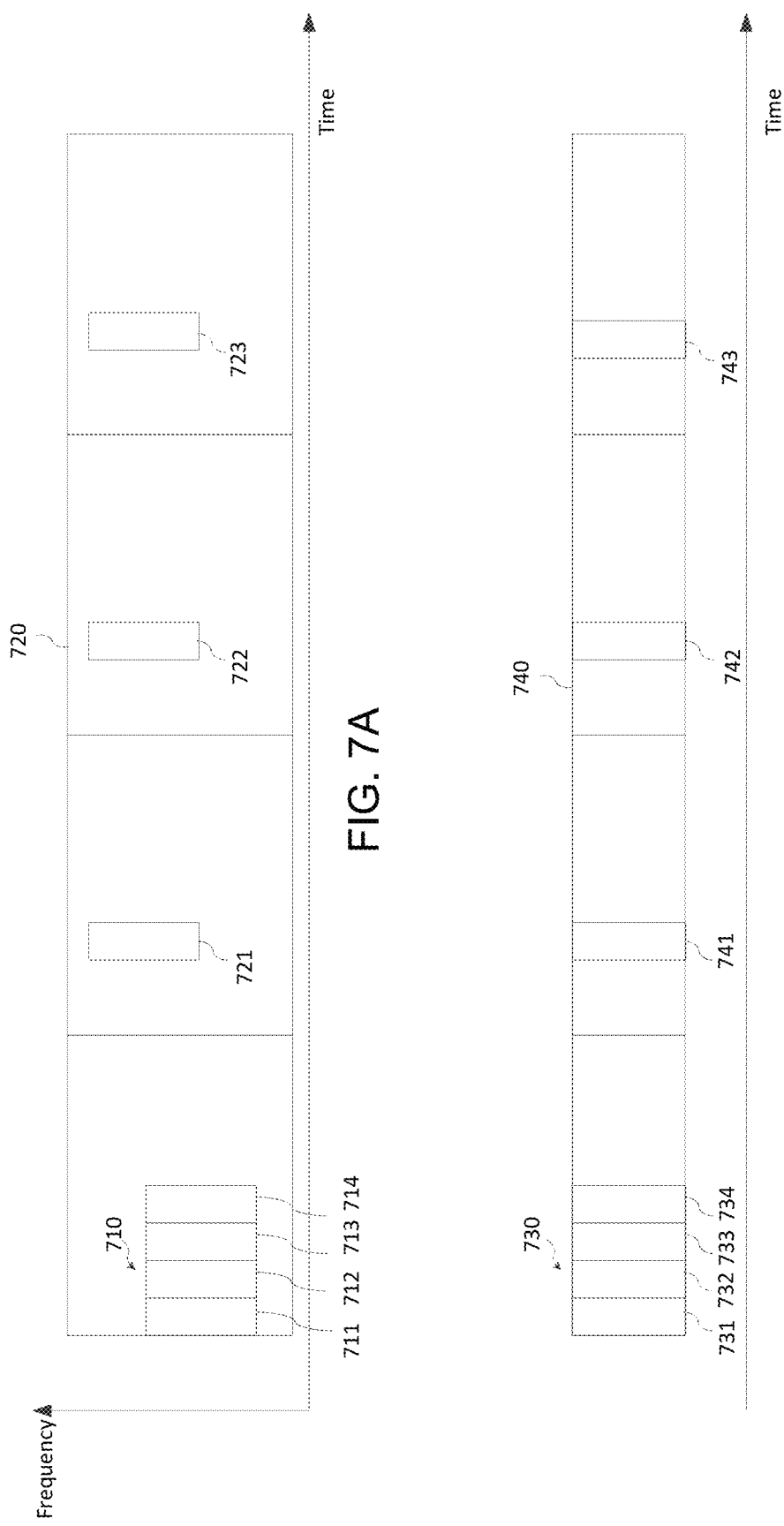

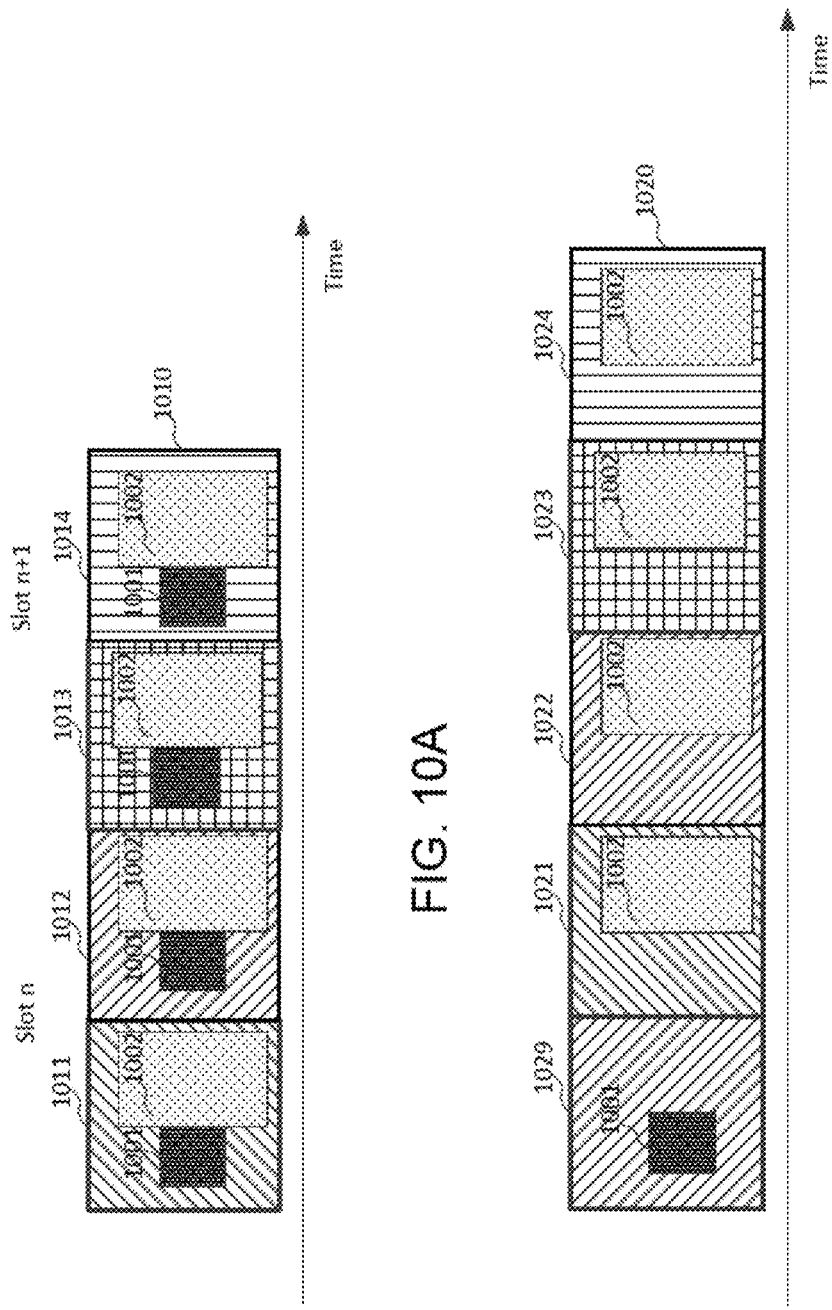

METHODS AND APPARATUS FOR RESOURCE ALLOCATION AND FEEDBACK IN VEHICLE TO VEHICLE COMMUNICATION

CROSS-REFERENCE TO RELATED APPLICATION AND CLAIMS OF PRIORITY

This application claims priority under 35 U.S.C. § 119(e) to: U.S. Provisional Patent Application No. 62/541,234 filed on Aug. 4, 2017; U.S. Provisional Patent Application No. 62/556,609 filed on Sep. 11, 2017; U.S. Provisional Patent Application No. 62/559,305 filed on Sep. 15, 2017; and U.S. Provisional Patent Application No. 62/684,358 filed on Jun. 13, 2018. The above-identified provisional patent applications are hereby incorporated by reference in their entirety.

TECHNICAL FIELD

The present disclosure relates generally to wireless communication systems and, more specifically, to communication network protocols, including vehicle-to-device, vehicle-to-vehicle, and vehicle-to-network communication resource allocation and feedback methods.

BACKGROUND

Traditionally, cellular communication networks have been designed to establish wireless communication links between mobile devices and fixed communication infrastructure components (such as base stations or access points) that serve users in a wide or local geographic range. However, a wireless network can also be implemented to utilize only device-to-device (D2D) communication links without a need for fixed infrastructure components. This type of network is typically referred to as an ad-hoc network. A hybrid communication network can support devices that connect both to fixed infrastructure components and to other D2D-enabled devices. While end user devices such as smartphones may be envisioned for D2D communication networks, a vehicular communication network, such as vehicle to everything (V2X) may be supported by a communication protocol where vehicles exchange control and data information between other vehicles (vehicle to vehicle (V2V)) or other infrastructure (vehicle to infrastructure (V2I)) and end-user devices (vehicle to pedestrian (V2P)). Multiple types of communication links may be supported by nodes providing V2X communication in a network, and utilizing the same or different protocols and systems.

SUMMARY

The present disclosure provides the methods and apparatus for multi-beam based transmission for the sidelink and V2X communication. The present disclosure also provides the methods and apparatus for V2X transmission supporting the HARQ process to improve the transmission reliability.

In one aspect, a user equipment (UE) in a wireless communication includes a controller configured to identify a configured pool of hybrid automatic repeat request (HARQ) process numbers that is configured by a next generation NodeB (gNB) for transmission on a sidelink channel, search one or more a scheduling assignments (SAs) of one or more other UEs to determine whether any of the HARQ process numbers are being used by any of the one or more other UEs, exclude any of the HARQ process numbers that are being used from a pool of remaining HARQ process numbers, select a HARQ process number from the pool of remaining HARQ process numbers, generate a sidelink control information (SCI) to include the selected HARQ process number. The UE further includes a transmitter configured to perform a transmission or re-transmission of a packet over a sidelink to another UE, using the selected HARQ process number.

In one embodiment, the selected HARQ process number is released after one transmission is sent successfully or reaches a maximum re-transmission number.

In another embodiment, when a same HARQ process number is selected by two UEs, one of the two UEs that has performed a higher number of re-transmissions takes the same HARQ process number and the other of the two UEs releases the same HARQ process number.

In yet another embodiment, wherein the HARQ process number is selected from the pool of remaining HARQ process numbers on a random basis.

In addition, when the transmission on the sidelink channel is a multi-cast or broadcast transmission to a plurality of UEs, the controller is further configured to expect only one of a non-acknowledgement (NACK) message or no transmission in the feedback channel, and not to expect an acknowledgement (ACK) message in the feedback channel.

Additionally, when the transmission on the sidelink channel is a multi-cast or broadcast transmission to a plurality of UEs, the controller is configured to expect to receive only one of a NACK message or no transmission in a first sub-channel, and the UE is configured to expect to receive only one of a ACK message or no transmission in a second sub-channel.

Further, resource blocks of at least one subchannel in the frequency domain are evenly divided to form time units in the time domain, and transmit (TX) beams with different directions are mapped to respective ones of the time units, and a same physical sidelink shared channel (PSSCH) is repeated within each of the time units.

Furthermore, the one or more other UEs are determined based on a distance between UEs or a signal strength of a wireless communication signal.

In addition, a plurality of resource pools are configured with association to moving directions of the UE, and the UE is further configured to choose one of the plurality of resource pools for a sidelink transmission according to a driving direction of the UE In another aspect, a method of operating a user equipment (UE) in a wireless communication is provided. The method includes identifying a pool of hybrid automatic repeat request (HARQ) process numbers that is configured by a next generation NodeB (gNB) for transmission on a sidelink channel, searching one or more scheduling assignments (SAs) of one or more other UEs to determine whether any of the HARQ process numbers are being used by any of the one or more other UEs, excluding the at least one HARQ process number from the pool of HARQ process numbers, selecting a HARQ process number from the pool of remaining HARQ process numbers, generating a sidelink control information (SCI) to include the selected HARQ process number, and transmitting a first transmission or re-transmission of a packet over a sidelink to another user equipment, using the selected HARQ process number.

In yet another aspect, a user equipment (UE) in a wireless communication is provided. The UE includes a transceiver configured to receive a sidelink packet and a sidelink control information (SCI) including a hybrid automatic repeat request (HARQ) process number via a sidelink from another UE, and a controller configured to consider the received sidelink packet as a re-transmission of a previous sidelink packet based on identifying that SCIs of the received sidelink packet and previous sidelink packet contain a same HARQ process number.

Other technical features may be readily apparent to one skilled in the art from the following FIGS., descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7A illustrates another exemplary resource structure with one or multiple sub-resources in the time domain in single-carrier waveform-based sidelink transmission according to one embodiment of this disclosure.

FIG. 7B illustrates another exemplary resource structure with one or multiple sub-resources in the time domain in single-carrier waveform-based sidelink transmission according to one embodiment of this disclosure;

FIG. 10A illustrates an example method of SA and xPSSCH transmission and mapping in sub-resource-based resource allocation according to one embodiment of this disclosure;

FIG. 10B illustrates an example method of SA and xPSSCH transmission and mapping in sub-resource-based resource allocation according to one embodiment of this disclosure;

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein:

3rd generation partnership project (3GPP) TS 36.211 v14.2.0, "E-UTRA, Physical channels and modulation" ("REF 1"); 3GPP TS 36.212 v14.2.0, "E-UTRA, Multiplexing and Channel coding" ("REF 2"); 3GPP TS 36.213 v14.2.0, "E-UTRA, Physical Layer Procedures" ("REF 3"); 3GPP TS 36.321 v14.2.0, "E-UTRA, Medium Access Control (MAC) protocol specification" ("REF 4"); and 3GPP TS 36.331 v14.2.1, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
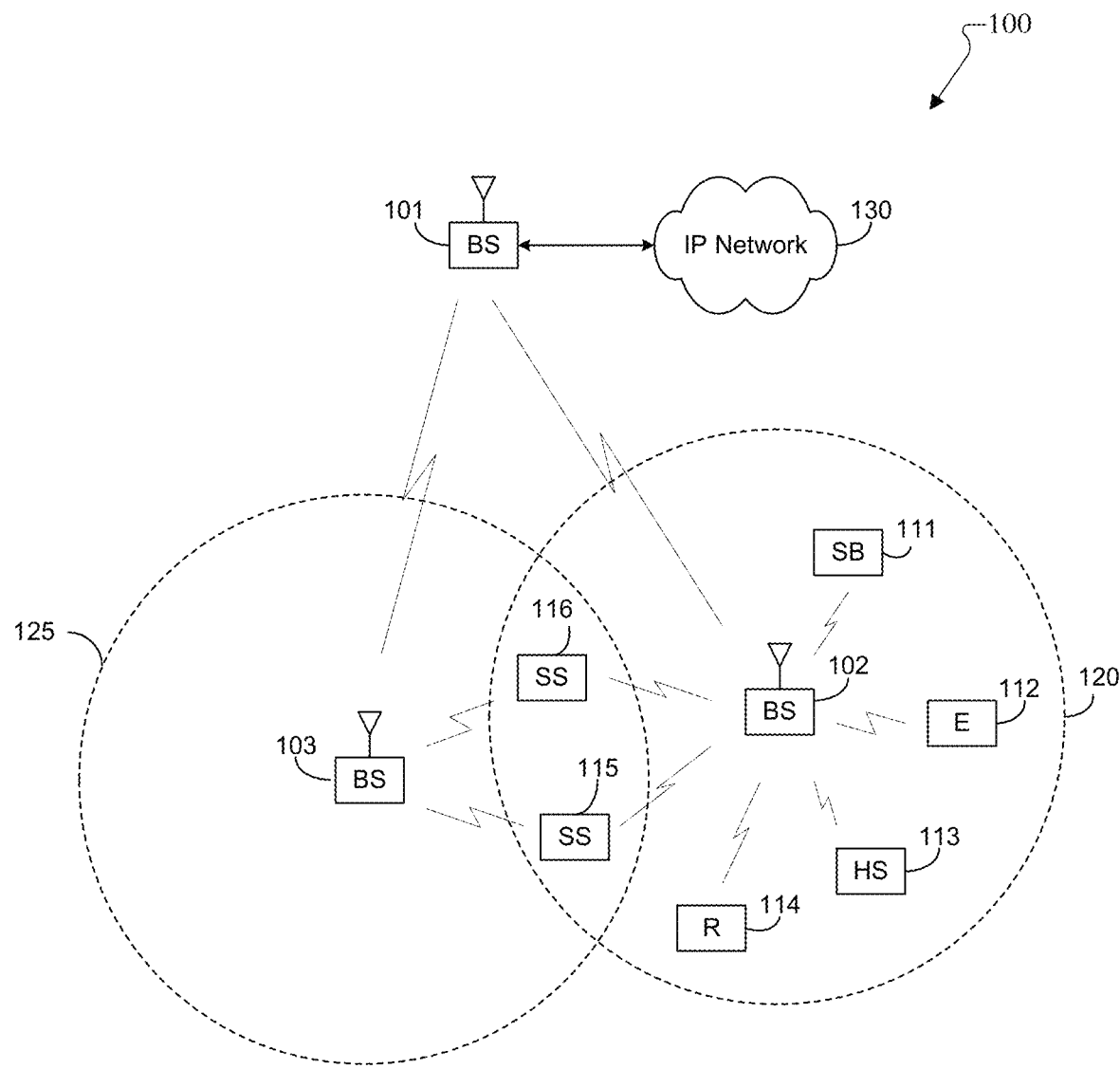
FIG. 1 illustrates an example wireless network according to some embodiments of the present disclosure.

FIG. 1 illustrates an example wireless network 100 according to some embodiments of the present disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the transmission of control and data in vehicle to vehicle communication.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
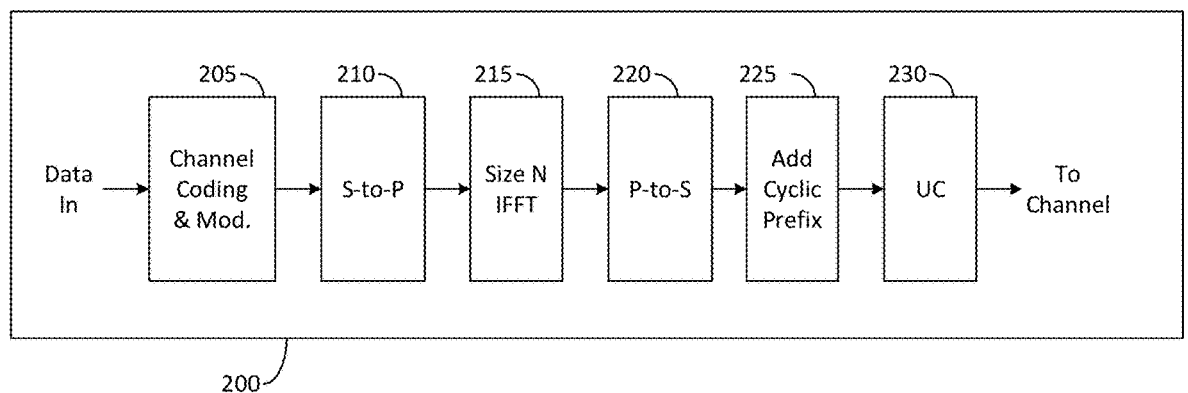
FIGS. 2A and 2B illustrate example wireless transmit and receive paths according to some embodiments of the present disclosure.
Figure 2B:
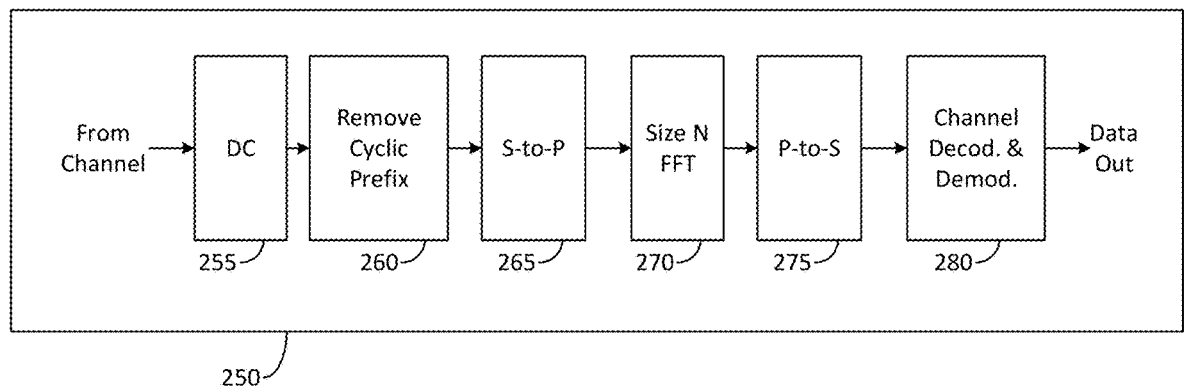

FIGS. 2A and 2B illustrate example wireless transmit and receive paths according to some embodiments of the present disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the transmission of control and data in vehicle to vehicle communication.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
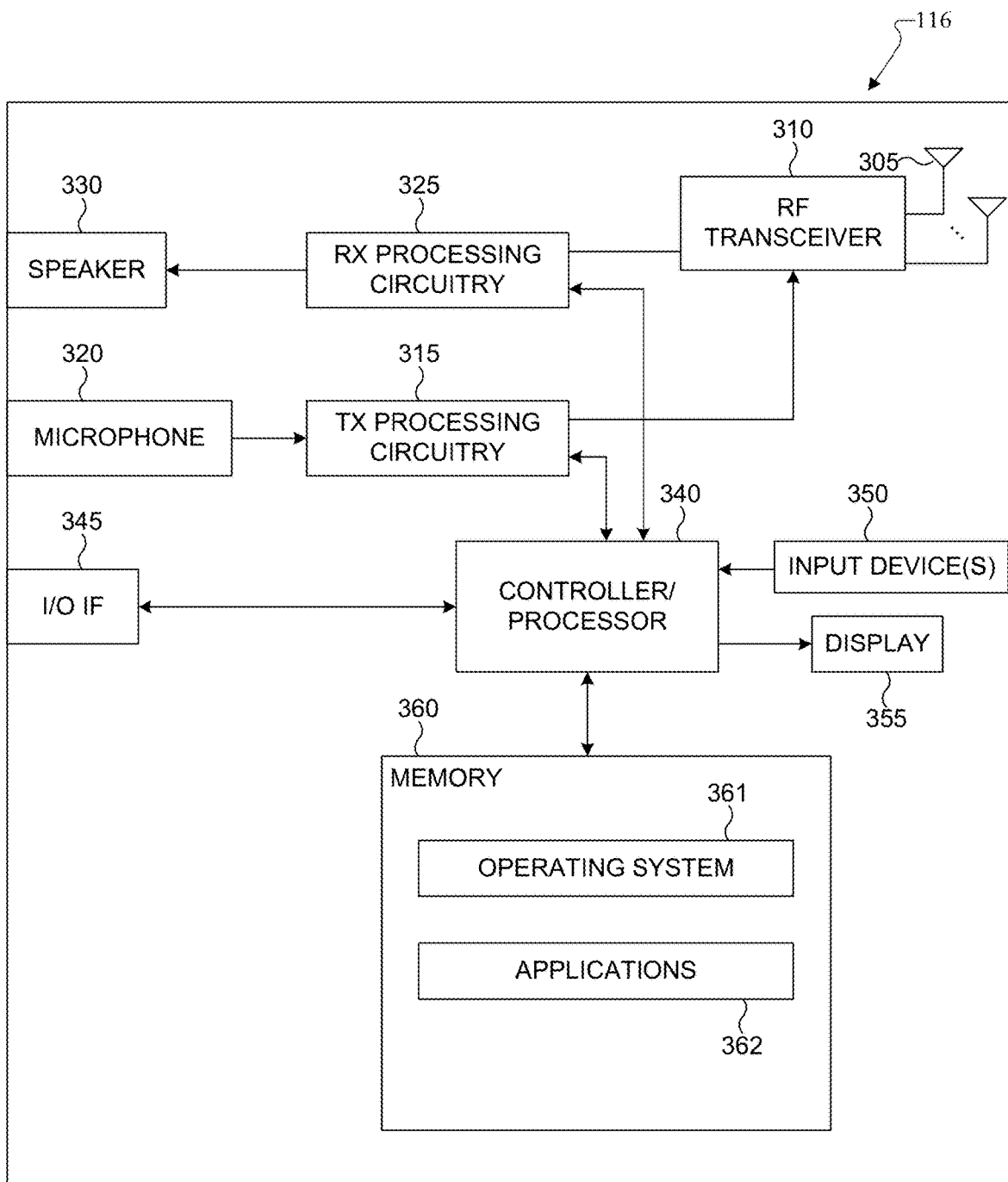
FIG. 3A illustrates an example user equipment according to some embodiments of the present disclosure.

FIG. 3A illustrates an example UE 116 according to some embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
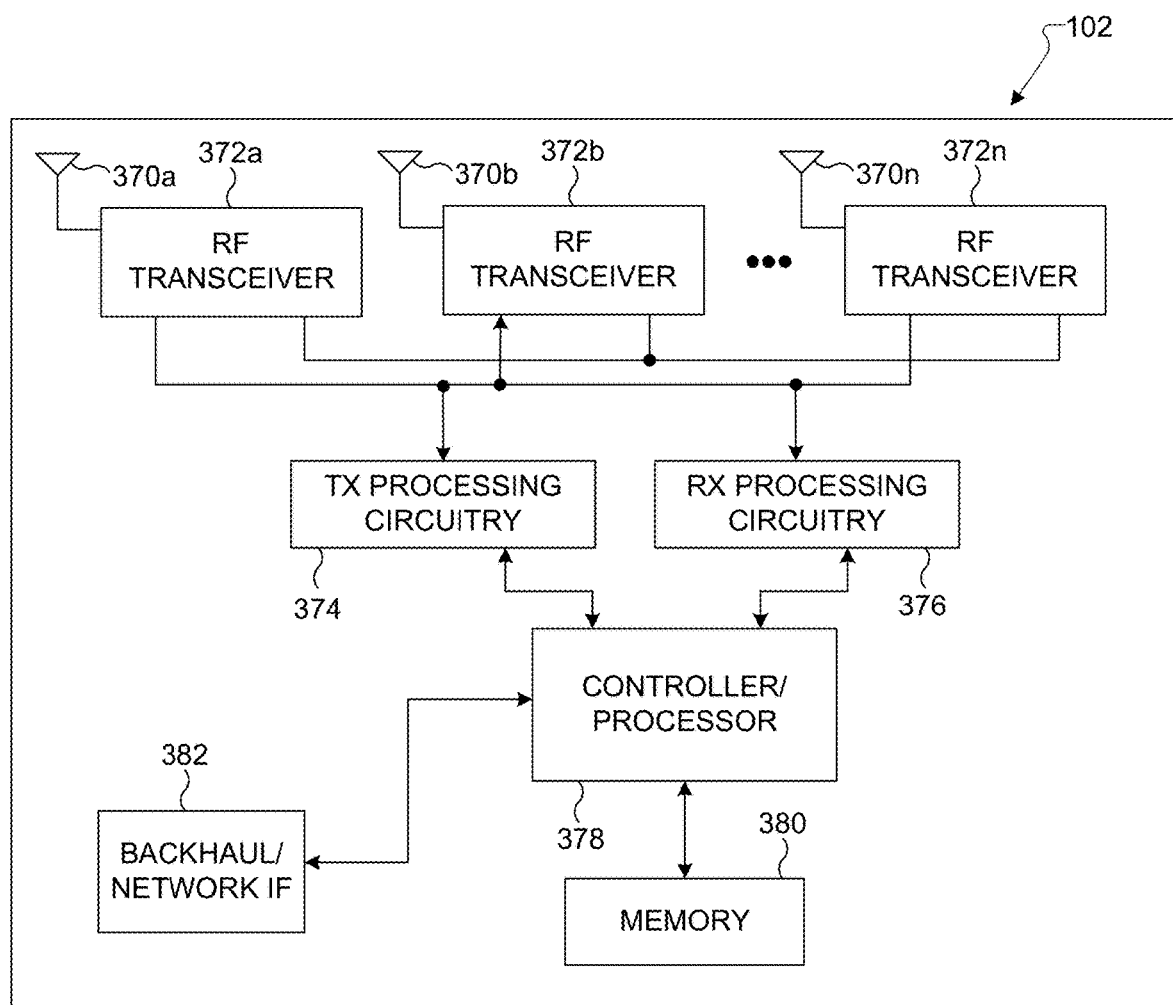
FIG. 3B illustrates an example enhanced NodeB (eNB) according to some embodiments of the present disclosure.

FIG. 3B illustrates an example eNB 102 according to some embodiments of the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting the transmission of control and data in vehicle to vehicle communication as described in embodiments of the present disclosure. In some embodiments, the controller/processor 378 supports communications between entities, such as web Real-Time Communication (RTC). The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

A communication system includes a downlink (DL) that conveys signals from transmission points such as base stations or eNBs to UEs and an uplink (UL) that conveys signals from UEs to reception points such as eNBs. A UE, also commonly referred to as a terminal or a mobile station, may be fixed or mobile and may be a cellular phone, a personal computer device, or an automated device. An eNB, which is generally a fixed station, may also be referred to as an access point or other equivalent terminology.

DL signals include data signals conveying information content, control signals conveying DL control information (DCI), and reference signals (RS) that are also known as pilot signals. An eNB transmits data information or DCI through respective physical DL shared channels (PDSCHs) or physical DL control channels (PDCCHs). The PDCCH can be an enhanced PDCCH (EPDDCH) but the term PDCCH will be used for brevity to denote PDCCH or EPDCCH. A PDCCH is transmitted over one or more control channel elements (CCEs). An eNB transmits one or more of multiple types of RS including a UE-common RS (CRS), a channel state information RS (CSI-RS), and a demodulation RS (DMRS). A CRS is transmitted over a DL system bandwidth (BW) and can be used by UEs to demodulate data or control signals or to perform measurements. To reduce CRS overhead, an eNB can transmit a CSI-RS with a smaller density in the time and/or frequency domain than a CRS. For channel measurement, non-zero power CSI-RS (NZP CSI-RS) resources can be used. For interference measurement reports (IMRs), CSI interference measurement (CSI-IM) resources associated with zero power CSI-RS (ZP CSI-RS) resources can be used [3]. A CSI process consists of NZP CSI-RS and CSI-IM resources. DMRS is transmitted only in the BW of a respective PDSCH and a UE can use the DMRS to demodulate information in a PDSCH.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or the UE can transmit data and some UCI in a PUSCH and transmit remaining UCI in a PUCCH when the eNB configures the UE for simultaneous PUSCH and PUCCH transmission. UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI enabling an eNB to select appropriate parameters for link adaptation of PDSCH or PDCCH transmissions to a UE.

CSI includes a channel quality indicator (CQI) informing an eNB of a DL signal to interference and noise ratio (SINR) experienced by the UE, a precoding matrix indicator (PMI) informing an eNB how to apply beam-forming for DL transmissions to the UE, and a rank indicator (RI) informing the eNB of a rank for a PDSCH transmission. UL RS includes DMRS and sounding RS (SRS). A UE transmits DMRS only in a BW of a respective PUSCH or PUCCH and an eNB can use a DMRS to demodulate information in a PUSCH or PUCCH. A UE transmits SRS to provide an eNB with an UL CSI. A SRS transmission from a UE can be periodic (P-SRS, or trigger type 0 SRS) or aperiodic (A-SRS, or trigger type 1 SRS) as triggered by a SRS request field included in a DCI format conveyed by a PDCCH scheduling PUSCH or PDSCH.

A transmission time interval (TTI) for DL transmission or for UL transmission is referred to as a subframe (SF) and includes two slots. A unit of ten SFs is referred to as a system frame. A system frame is identified by a system frame number (SFN) ranging from 0 to 1023 and can be represented by 10 binary elements (or bits). A BW unit for a DL transmission or for an UL transmission is referred to as a resource block (RB), one RB over one slot is referred to as a physical RB (PRB), and one RB over one SF is referred to as a PRB pair. Each RB consists of $N_{sc}^{RB}$ sub-carriers, or resource elements (REs). A RE is identified by the pair of indexes (k,l) where k is a frequency domain index and l in a time domain index. An eNB informs parameters for a PDSCH transmission to a UE or parameters for a PUSCH transmission from the UE, through a DCI format with CRC scrambled by a cell radio network temporary identifier (C-RNTI), that is conveyed in a PDCCH the eNB transmits to the UE and is respectively referred to as DL DCI format or UL DCI format.

A communication system includes a downlink (DL) that conveys signals from transmission points such as base stations (BSs) or NodeBs to user equipments (UEs) and an uplink (UL) that conveys signals from UEs to reception points such as NodeBs. Additionally, a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as E-UTRAN (Evolved Universal Terrestrial Access Network).

In a communication system, DL signals can include data signals conveying information content, control signals conveying DL control information (DCI), and reference signals (RS) that are also known as pilot signals. A NodeB transmits data information through a physical DL shared channel (PDSCH). A NodeB transmits DCI through a physical DL control channel (PDCCH) or an enhanced PDCCH (EPDCCH). Messages are transmitted on the PDCCH using a cell radio network temporary identifier (C-RNTI) to identify the intended UE. The C-RNTI is the RNTI to be used by a given UE while the UE is in a particular cell after the UE and a NodeB establish an RRC connection. A NodeB transmits one or more of multiple types of RS including a UE-common RS (CRS), a channel state information RS (CSI-RS), or a DeModulation RS (DMRS). A CRS is transmitted over a DL system bandwidth (BW) and can be used by UEs to obtain a channel estimate to demodulate data or control information or to perform measurements. To reduce CRS overhead, a NodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a sub-frame (SF) and can have, for example, duration of 1 millisecond. A number of ten SFs is referred to as a frame and is identified by a system frame number (SFN).

Traditionally, cellular communication networks have been designed to establish wireless communication links between mobile devices (UEs) and fixed communication infrastructure components (such as base stations or access points) that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles or other infrastructure or UEs. Such a network is referred to as a V2X network. Multiple types of communication links can be supported by nodes supporting V2X in the network and can utilize same or different protocols and systems.

Figure 4A:
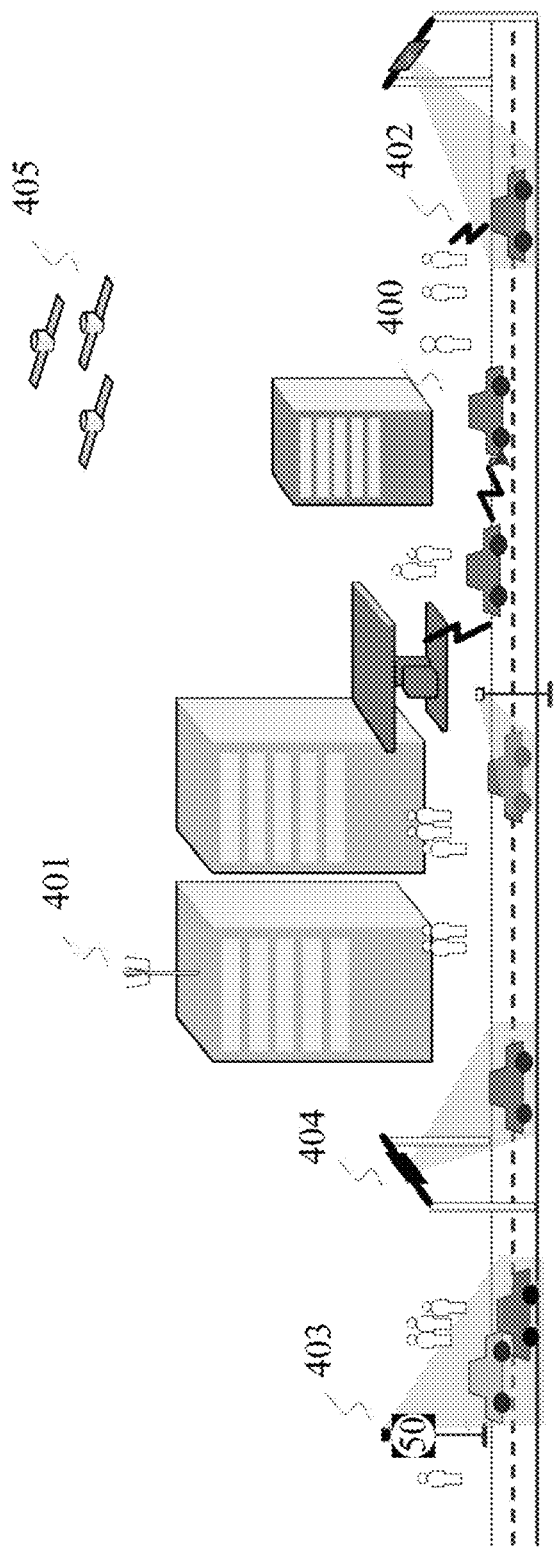
FIG. 4A illustrates an example use case of a vehicle-centric communication network according to illustrative embodiments of the present disclosure.

FIG. 4A illustrates an example use case of a vehicle-centric communication network according to illustrative embodiments of the present disclosure. The embodiments shown in FIG. 4A are for illustration only. Other embodiments could be used without departing from the scope of the present disclosure.

The vehicular communication, referred to as Vehicle-to-Everything (V2X), contains the following three different types: Vehicle-to-Vehicle (V2V) Communications, Vehicle-to-Infrastructure (V2I) Communications, and Vehicle-to-Pedestrian (V2P) Communications. These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

The V2X communication can be used to implement several types of services that are complementary to a primary communication network or to provide new services based on a flexibility of a network topology. V2X can support unicasting, broadcasting, or group/multicasting as potential means for V2V communication 400 where vehicles are able to transmit messages to all in-range V2V-enabled devices or to a subset of devices that are members of particular group. The protocol can be based on LTE-D2D or on a specialized LTE-V2V protocol. V2X can support V2I communication 401 between one or more vehicles and an infrastructure node to provide cellular connectivity as well as specialized services related to control and safety of vehicular traffic. V2P communication 402 can also be supported, for example to provide safety services for pedestrians or traffic management services. V2X multicast communication 403 can be used to provide safety and control messages to large numbers of vehicles in a spectrally efficient manner. The two primary standardized messages for V2V/V2I communication are the periodic beacons called Cooperative Awareness Messages (CAM) and the event-triggered warning messages, called Decentralized Environment Notification Messages (DENM). The CAMs are periodically broadcasted beacons used to maintain awareness of the surrounding vehicles. These messages are sent with an adaptive frequency of 1-10 Hz. The CAMs include information such as position, type and direction.

The CAM generation triggers the following two conditions.

1. The time elapsed since the last CAM generation is equal to or greater than a minimum value and one of the following UE-dynamics related conditions is given: a. the absolute difference between the current heading of the originating UE and the heading included in the CAM previously transmitted by the originating UE exceeds 4°; b. the distance between the current position of the originating UE and the position included in the CAM previously transmitted by the originating UE exceeds 4 m; and c. the absolute difference between the current speed of the originating UE and the speed included in the CAM previously transmitted by the originating UE exceeds 0.5 m/s.

2. The time elapsed since the last CAM generation is equal to or greater than a maximum value.

If one of the above two conditions is satisfied, a CAM shall be generated immediately. Thus, CAM messages generation times and sizes are not completely deterministic from a traffic modelling perspective. Nevertheless, the typical time difference between consecutive packets generation is bounded to the [0.1, 1] sec range.

The DENMs are event-triggered warning messages which are generated to alert neighboring vehicles about potential hazards.

While vehicle devices can be able to support many different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 404 can be supported such as, for example, traffic tracking beacons. Satellite-based communication 405 can also be supported for V2X networks for communication or positioning services.

Direct communication between vehicles in V2V is based on a sidelink (SL) interface. Sidelink is the UE to UE interface for SL communication and SL discovery. The SL corresponds to the PC5 interface as defined in REF 6. SL communication is defined as a functionality enabling proximity services (ProSe) Direct Communication as defined in REF 6 between two or more nearby UEs using E-UTRA technology but not traversing any network node.

E-UTRAN allows such UEs that are in proximity of each other to exchange V2V-related information using E-UTRA (N) when permission, authorization and proximity criteria are fulfilled. The proximity criteria can be configured by the mobile network operator (MNO). However, UEs supporting V2V Service can exchange such information when served by or not served by E-UTRAN which supports V2X Service. In one embodiment, the proximity can be defined based on a signal strength. In other words, the proximity can be in a distance with a signal strength that is sufficiently strong so that a reliable decoding is allowed. The UE supporting V2V applications transmits application layer information (e.g. about its location, dynamics, and attributes as part of the V2V Service). The V2V payload must be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, and the like.

Figure 4B:
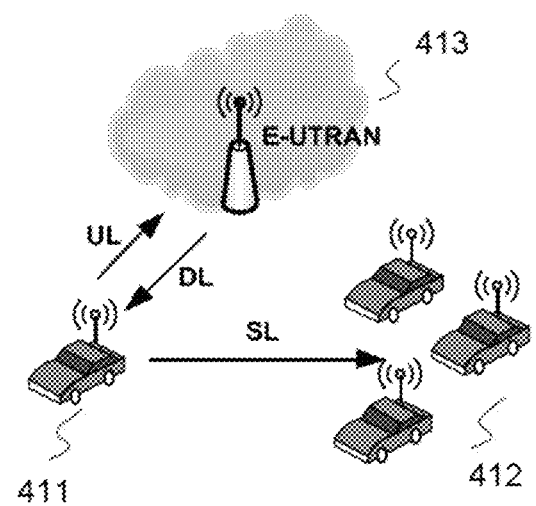
FIG. 4B illustrates an example sidelink (SL) interface according to illustrative embodiments of the present disclosure.

FIG. 4B illustrates an example SL interface according to illustrative embodiments of the present disclosure. The embodiments shown in FIG. 4B are for illustration only. Other embodiments could be used without departing from the scope of the present disclosure.

While UL designates the link from UE 411 to NodeB 413 and DL designates the reverse direction, SL designates the radio links over the PC5 interfaces between UE 411 and UEs 412. UE 411 transmits a V2V message to multiple UEs 412 in the SL. SL communication happens directly without using E-UTRAN technology and not traversing any network node NodeB 413. The PC5 interface re-uses existing frequency allocation, regardless of the duplex mode (frequency division duplex (FDD) or time division duplex (TDD). To minimize hardware impact on a UE and especially on the power amplifier of the UE, transmission of V2V links occurs in the UL band in case of FDD. Similar, the PC5 interface uses SFs that are reserved for UL transmission in TDD. The signal transmission is based on single carrier frequency division multiple access (SC-FDMA) that is also used for UL transmission. The new channels can be largely based on the channel structure applicable for the transmission of the physical UL shared channel (PUSCH).

SL transmission and reception occur with resources assigned to a group of devices. A resource pool (RP) is a set of resources assigned for sidelink operation. It consists of the subframes and the resource blocks within the subframe. For SL communication, two additional physical channels are introduced: Physical Sidelink Control Channel (PSCCH) carrying the control information, and Physical Sidelink Shared Channel (PSSCH) carrying the data.

Figure 5:
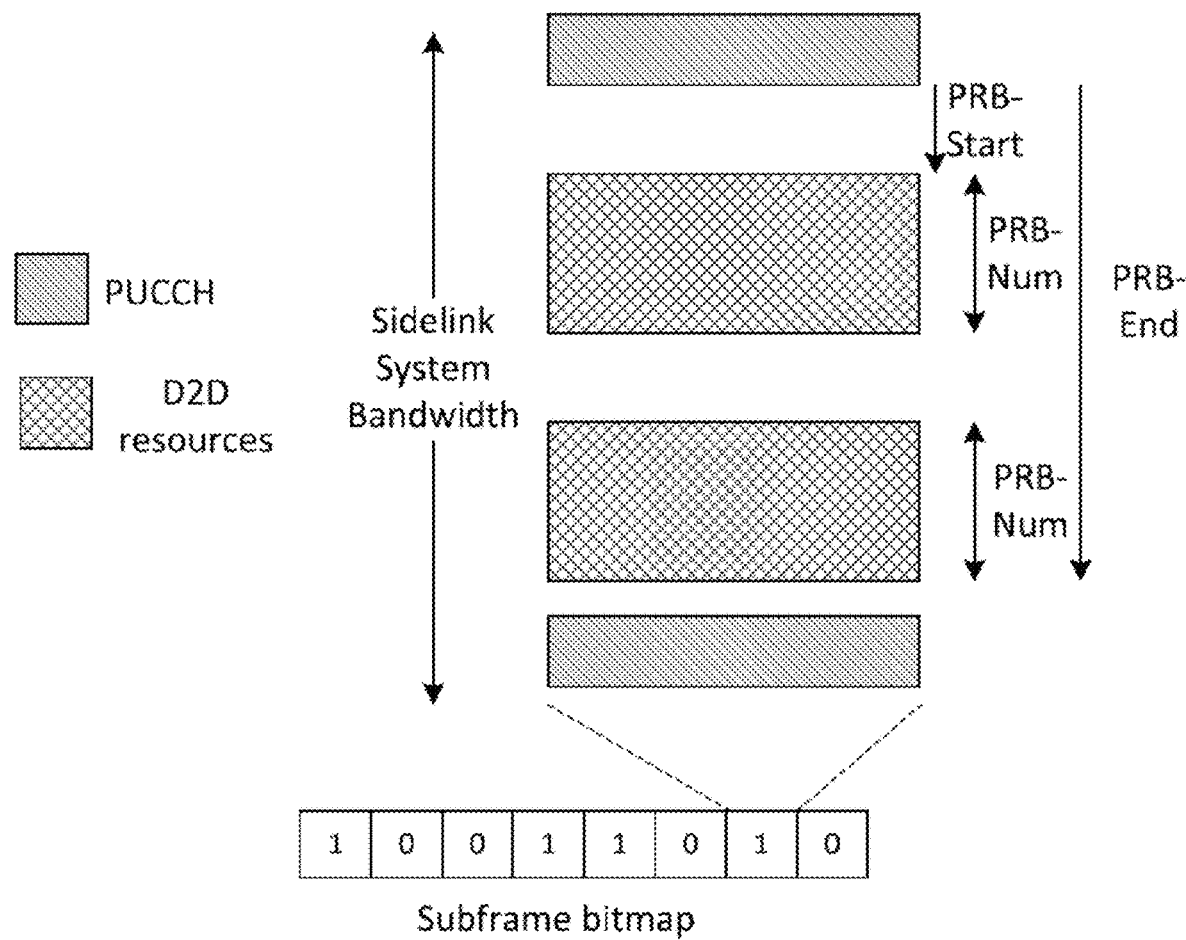
FIG. 5 illustrates an exemplary resource allocation with one or multiple sub-resource in the time domain in a sidelink channel according to one embodiment of this disclosure.

FIG. 5 illustrates an example resource pool for PSCCH according to illustrative embodiments of the present disclosure. The embodiment shown in FIG. 5 is for illustration only. Other embodiments could be used without departing from the scope of the present disclosure.

The pool is defined as follows. (a) in frequency: by parameters, PRBnum that defines the frequency range in Physical Resource Block (PRB) bandwidth units; and PRB start and PRBend, which define the location in the frequency domain within the uplink band; and (b) in the time domain: by a bitmap that indicates the 1 msec sub-frames used for PSCCH transmission.

This block of resources is repeated with a period defined by a parameter SC-Period (expressed in sub-frame duration, i.e. 1 msec). The range of possible values for SC-Period is from 40 msec to 320 msec: low values are supported for voice transmission.

All the parameters needed to define the resource pool are broadcasted in a System Information Block (SIB) by the network. The devices which are not within coverage (and hence cannot acquire the SIB) shall use some pre-configured values internally stored. The PSCCH is used by the D2D transmitting UE to make the members of its group aware of the next data transmission that will occur on the PSSCH. The D2D transmitting UE sends the sidelink control information (SCI) on the PSCCH as shown in Table 1.

TABLE 1

| Parameter | Usage |
| --- | --- |
| Group Destination ID | used by the receiving devices to determine whether they have some interest in this announcement. If the identifier does not match, they do not need to monitor sidelink channels until the next SC-Period. |
| Modulation and Coding Scheme | To indicate modulation and coding rate for the data. |
| Resource block assignment and hopping resource allocation | give the receiving devices information about the resources of the PSSCH that they shall decode in the frequency domain. |
| Frequency hopping flag | |
| Time Resource Pattern (T-RPT) | give the receiving devices information about the resources of the PSSCH that they shall decode in the time domain. |
| Timing advance | |

Devices interested in receiving D2D services blindly scan the whole PSCCH pool to search if a SCI format matching their group identifier can be detected. On the transmitting device side, resources to transmit the SCI format information shall be selected within the PSCCH pool.

There are two types of resource pools: Reception Resource Pools (Rx RPs) and Transmission Resource Pools (Tx RPs). These are either signaled by the NodeB for in-coverage case or a pre-configured value is used for the out-of-coverage case. Within a cell, there may be more Rx RPs than Tx RPs to enable reception from adjacent cells or from out-of-coverage UEs.

Two modes of resource allocation have been defined for SL communication: Mode 1, also referred as "Scheduled resource allocation" and Mode 2, also referred as "UE autonomous resource selection."

In mode 1, access to the sidelink resources is driven by the NodeB. The UE needs to be connected to transmit data in the following three cases.

The UE wishing to use direct communication feature sends an indication to the network. It will be assigned a temporary identifier SL-RNTI (Sidelink Radio Network Temporary Identifier). This identifier will be used by the eNodeB to schedule the future D2D transmission.

When the UE has some data to transmit in D2D mode, it sends a sidelink-BSR (Buffer Status Report) to the eNodeB which gives an indication on the amount of data to be transmitted in D2D mode. Based on this information, the eNodeB sends to the UE the allocation on both PSCCH and PSSCH for its D2D transmission. The allocation information is sent over the PDCCH (Physical Downlink Control Channel) by sending a DCI Format 5, scrambled by the SL-RNTI. The information contained in DCI format 5 is detailed in Table 2. A large part of the DCI Format 5 information is directly reflected in the content of the SCI format 0.

Based on the information received in the DCI format 5, the D2D transmitting devices sends the SCI format 0 over the resources within the PSCCH pool allocated by the eNodeB, followed by the data over the resources allocated by the eNodeB for PSSCH transmission.

TABLE 2

| Parameter | Bits | Usage |
| --- | --- | --- |
| Resource for PSCCH | 6 | Provides the information of the transmitting UE of the resource to be used for SCI format 0 transmissions within the PSCCH pool. |
| TPC command | 1 | If this bit is not set, the transmitting UE is allowed to transmit D2D signals at the maximum power. Otherwise, it shall comply with power control rules based on open loop. |
| Resource block assignment and hopping resource allocation | 5-13 | give to the receiving devices the information of the resources of the PSSCH that they shall decode in the frequency domain. |
| Frequency hopping flag | 1 | |
| Time Resource Pattern (T-RPT) | 7 | give to the receiving devices the information of the resources of the PSSCH that they shall decode in the time domain. |

In mode 1, there is no pre-allocated or reserved resource for PSSCH: it is assigned "on-demand" by the NodeB. In addition, since the NodeB is responsible to give access to the resources within the PSCCH pool, collision on the PSCCH transmission can be avoided.

In mode 2, the UE transmitting D2D data does not need to be connected to the eNodeB: it selects autonomously and randomly the resources within the PSCCH pool to transmit the SCI Format 0.

In addition to the PSCCH pool, there is also a PSSCH pool which defines reserved resources for PSSCH transmission. It is defined in a similar way as the PSCCH pool (PRBStart, PRBend, PRBNum in the frequency domain and a sub-frame bitmap in the time domain which is repeated up to the next PSCCH occurrence). The SCI Format 0 designates the portion of the pool that is used for D2D transmission. Since the transmitting UE is not necessarily connected to the NodeB, the timing advance information may be not known and the corresponding parameter in the SCI Format 0 shall be set to 0.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

Figure 6:
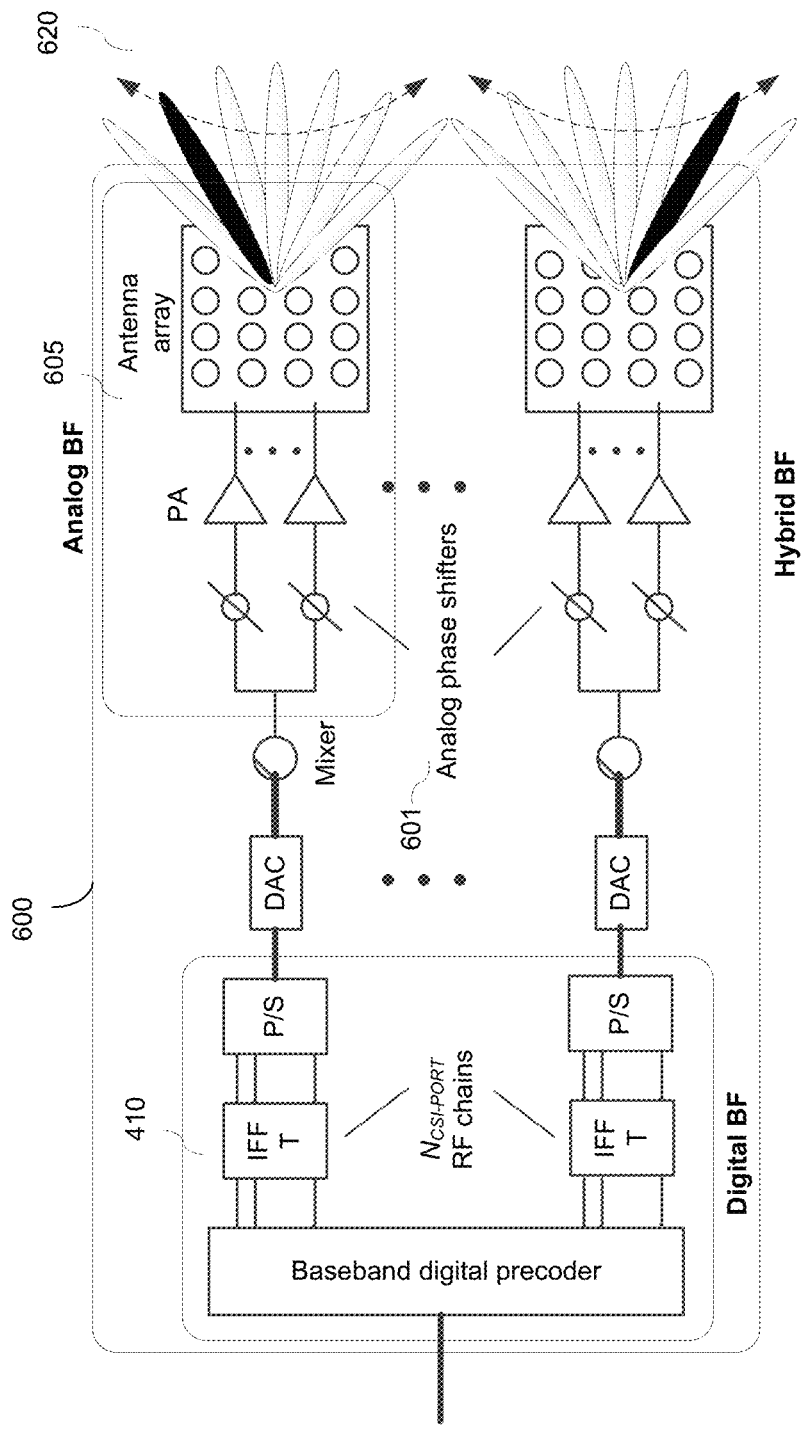
FIG. 6 illustrates exemplary antenna elements for multi-beam based transmission according to one embodiment of the present disclosure.

FIG. 6 illustrates exemplary antenna elements for multi-beam based transmission according to one embodiment of the present disclosure. The embodiment shown in FIG. 6 is for illustration only. Other embodiments could be used without departing from the scope of the present disclosure.

In this embodiment, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles (620) by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

Resource for Multi-Beam Based Transmission

In some embodiment, one resource on a sidelink channel can contain one or multiple sub-resource in the time domain so that the transmit UE can apply different transmit different beamforming direction on different time units and the receiver UE can apply different receive beamforming directions on different time units. The resource can be called as resource unit, sub-channel, channel, allocation unit, resource part and sub-resource. The name 'resource' is exemplary and can be substituted with other names and labels without changing the substance of this embodiment. The sub-resource can be called time unit, sub-time unit, resource sub-unit, resource subset, resource partition, resource sub-group, resource sub-channel. The name 'sub-resource' is exemplary and can be substituted with other names and labels without changing the substance of this embodiment. In OFDM-based or DFT-s-OFDM based system, one resource contains M PRBs in frequency domain and N sub-resources in the time domain. Each sub-resource contains one or more OFDM/DFT-s-OFDM symbols. In single-carrier based system, one resource contain N sub-resources in the time domain and each sub-resource contains one or more symbols. The transmitter UE can be requested to repeat the transmission block in those sub-resources in one resource and the receiver UE can be requested to assume that one resource is partitioned into multiple sub-resources and assume the transmission block is repeated in sub-resources.

The transmitter UE can assume that it can apply different transmit beamforming in different sub-resources. The receiver UE can be requested to assume that different beamforming direction can be applied to different sub-resources unless otherwise configured.

FIG. 7A illustrates an exemplary resource allocation with one or multiple sub-resource in the time domain in a sidelink transmission according to one embodiment of this disclosure. The embodiment shown in FIG. 7A is for illustration only. Other embodiments could be used without departing from the scope of the present disclosure.

As illustrated in FIG. 7A, one resource 710 contains four sub-resource in the time domain, which are 711, 712, 713 and 714. Each of the sub-resource can contain one or more OFDM or DFT-s-OFDM symbols. In frequency domain, resource 710 can occupy M PRBs and each of the sub-resource of 711, 712, 713 and 714 occupy the same M PRBs. The sub-resources in resource 710 are continuous in the time domain. One resource 720 contains 3 sub-resource in the time domain, which are 721, 722 and 723. Each of the sub-resources 721, 722 and 723 can occupy one or more OFDM or DFT-s-OFDM symbols in the time domain. In frequency domain, resource 720 can occupy M PRBs and each of the sub-resources of 721, 722 and 723 can occupy the same M PRBs. The sub-resources in resource 720 are not continuous in the time domain. Those three sub-resources 721, 722 and 723 in resource 720 are scattered in the time domain.

FIG. 7B illustrates another exemplary resource structure with one or multiple sub-resource in the time domain in single-carrier waveform-based sidelink transmission according to one embodiment of this disclosure. The embodiment shown in FIG. 7B is for illustration only. Other embodiments could be used without departing from the scope of the present disclosure.

As illustrated in FIG. 7B, one resource 730 contains four sub-resource in the time domain, which are 731, 732, 733 and 734. Each of the sub-resource can contain one or more symbols. The sub-resources in resource 730 are continuous in the time domain. One resource 740 contains 3 sub-resource in the time domain, which are 741, 742 and 743. Each of the sub-resources 741, 742 and 743 can occupy one or more symbols in the time domain. The sub-resources in resource 740 are not continuous in the time domain. Those three sub-resources 741, 742 and 743 in resource 740 are scattered in the time domain.

Figure 8A:
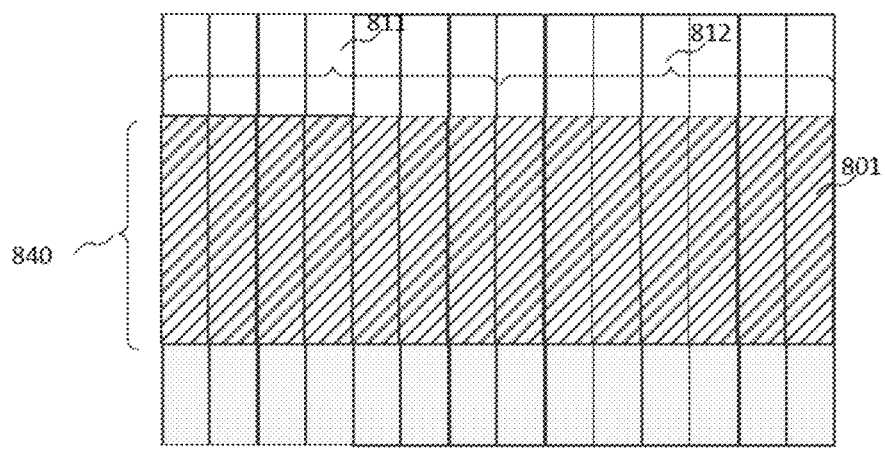
FIG. 8A illustrates an exemplary resource structure for multi-beam based sidelink transmission according to one embodiment of the present disclosure.

FIG. 8A illustrates an exemplary resource structure for multi-beam based sidelink transmission according to one embodiment of the present disclosure. The embodiment shown in FIG. 8A is for illustration only. Other embodiments could be used without departing from the scope of the present disclosure.

In one method, in an OFDM/DFT-s-OFDM-based system, there are 14 symbols in one slot. One resource is defined as N (e.g, =4, 5, 8, 10 . . . ) PRBs in frequency domain and 14 symbols in the time domain. One resource has two sub-resource and each sub-resource occupies 7 OFDM symbols. An example is illustrated in FIG. 6a 8A.

One resource 801 occupies N PRBs 840 in frequency domain. One resource 801 has two sub-resource, 811 and 812. Sub-resource 811 can occupy symbols 0~6 and sub-resource 812 can occupy symbols 7~13. The transmitter UE can be requested to transmit and repeat the transmission block in sub-resource 811 and 812. The receiver UE can be requested to assume the resource 801 is partitioned into sub-resource 811 and sub-resource 812. The receiver UE can be requested to assume the transmission block is repeated in sub-resources 811 and 812. The receiver UE can be requested to only decode the transmission block from one of the sub-resources 811 or 812. The receiver UE can be requested to assume that different transmit beamforming might be applied to sub-resource 811 and 812.

In one method, in an OFDM/DFT-s-OFDM-based system, there are 14 symbols in one slot. One resource is defined as N (e.g, =4, 5, 8, 10 . . . ) PRBs in frequency domain and 14 symbols in the time domain. One resource has seven sub-resource and each sub-resource occupies 2 OFDM symbols.

Figure 8B:
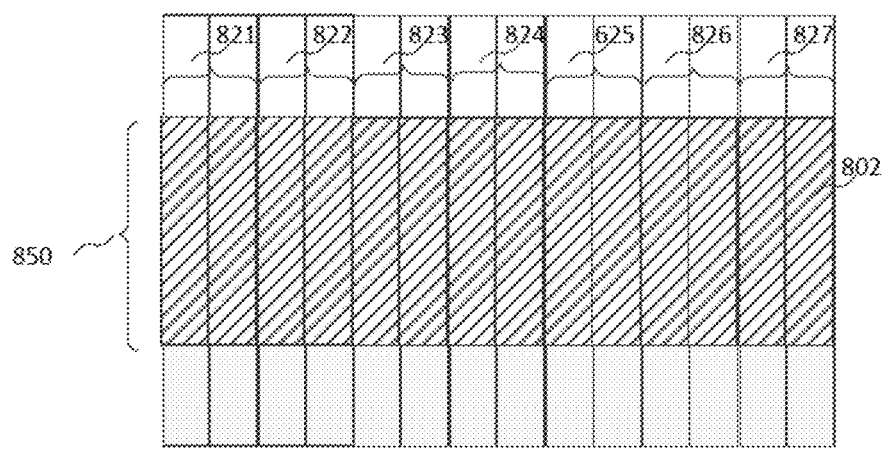
FIG. 8B illustrates another exemplary resource structure for multi-beam based sidelink transmission according to one embodiment of the present disclosure.

FIG. 8B illustrates another exemplary resource structure in single-carrier waveform-based sidelink transmission according to one embodiment of the present disclosure. The embodiment shown in FIG. 8A is for illustration only. Other embodiments could be used without departing from the scope of the present disclosure.

An example is illustrated in FIG. 8B. One resource 802 occupies N PRBs 850 in frequency domain. One resource 802 has seven sub-resources, 821~827. Sub-resource 821 can occupy symbols 0 and 1 and sub-resource 822 can occupy symbols 2 and 3 and so on so forth. The transmitter UE can be requested to transmit and repeat the transmission block seven times in sub-resources 821~827. The receiver UE can be requested to assume the resource 802 is partitioned into seven sub-resource 821~827. The receiver UE can be requested to assume the transmission block is repeated in sub-resources 821~827. The receiver UE can be requested to only decode the transmission block from one of the sub-resources 821~827. The receiver UE can be requested to assume that different transmit beamforming might be applied to sub-resources 821~827.

In one method, one resource can span over more than one slots in the time domain. The UE can be configured with a slot $n_0$ as the starting slot for resource partition. One resource occupy L slots in the time domain and the symbols within L slots of one resource can be partitioned into N sub-resources. So, one resource can occupy the symbols from slot $n_0$ to slot $n_0+L-1$. One resource can occupy the symbols from slot n0+L to slot n0+2×L−1. One resource can occupy the symbols from slot n0+p×L to slot n0+(p+1)×L−1, where p can be 0, 1, 2, . . . . . Please note here the index of slot can be logical index and two slots with adjacent index can be non-adjacent physically. In one example, a subset of the slots at one spectrum can be allocated for V2X transmission. The slots in the subset of slots allocated for V2X can be assigned with continuous logical slot index.

Figure 8C:
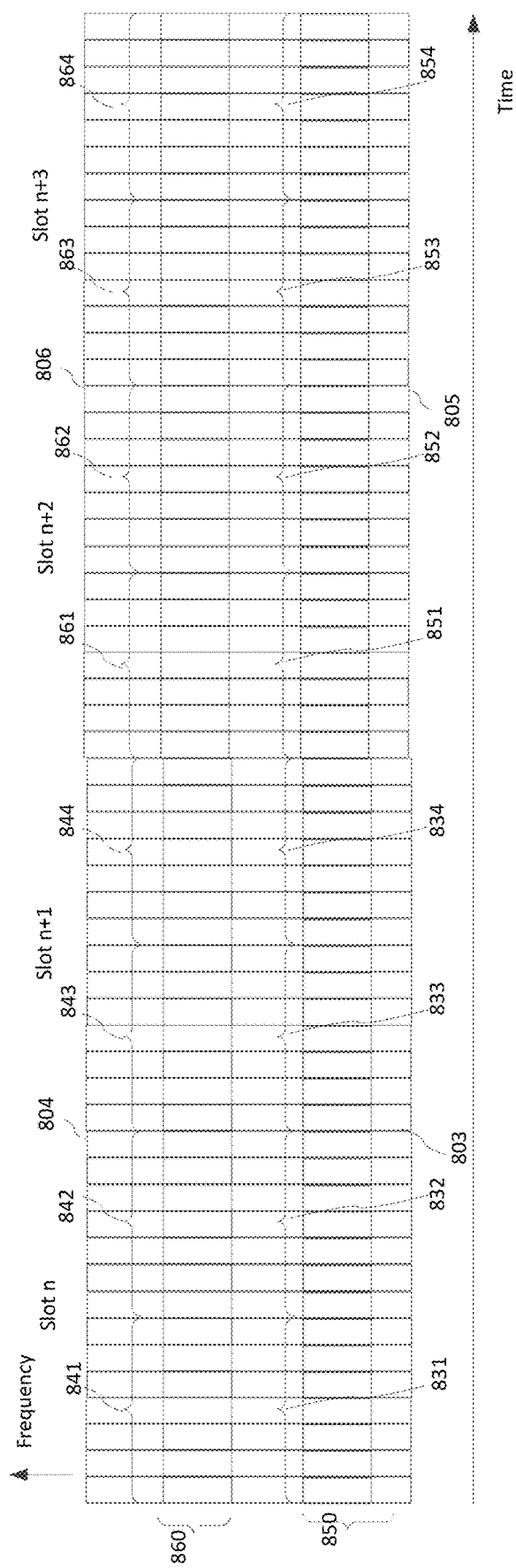
FIG. 8C illustrates an example of resource occupying multiple slots with multiple sub-resource in the time domain in single-carrier waveform-based sidelink transmission according to one embodiment of this disclosure.

FIG. 8C illustrates an example of resource occupying multiple slots with multiple sub-resource in the time domain in single-carrier waveform-based sidelink transmission according to one embodiment of this disclosure. The embodiment shown in FIG. 8C is for illustration only. Other embodiments could be used without departing from the scope of the present disclosure.

In the embodiment of FIG. 8C, one resource can span two slots and 28 symbols. One resource 803 can occupy 28 symbols within slots n and n+1 and M PRBs 850. Resource 803 can be partitioned into 4 sub-resources 831-834. Sub-resource 831 occupies symbols 0~6 at slot n and sub-resource 832 occupies symbols 7~13 at slot n. Sub-resource 833 occupies symbols 0~6 at slot n+1 and sub-resource 834 occupies symbols 7~13 at slot n+1. One resource 805 can occupy 28 symbols within slots n+2 and n+3 and M PRBs 850. Resource 805 can be partitioned into 4 sub-resources 851~854. Sub-resource 851 occupies symbols 0~6 at slot n+2 and sub-resource 852 occupies symbols 7~13 at slot n+2. Sub-resource 852 occupies symbols 0~6 at slot n+3 and sub-resource 854 occupies symbols 7~13 at slot n+3. One resource 804 can occupy 28 symbols within slots n and n+1 and M PRBs 860. Resource 804 can be partitioned into 4 sub-resources 841~844. Sub-resource 841 occupies symbols 0~6 at slot n and sub-resource 842 occupies symbols 7~13 at slot n. Sub-resource 843 occupies symbols 0~6 at slot n+1 and sub-resource 844 occupies symbols 7~13 at slot n+1. One resource 806 can occupy 28 symbols within slots n+2 and n+3 and M PRBs 860. Resource 806 can be partitioned into 4 sub-resources 851-854. Sub-resource 861 occupies symbols 0~6 at slot n+2 and sub-resource 862 occupies symbols 7~13 at slot n+2. Sub-resource 862 occupies symbols 0~6 at slot n+3 and sub-resource 864 occupies symbols 7~13 at slot n+3. For the transmission allocation containing resource 803, the transmitter can be requested to repeat the transmission block in four sub-resources spanning from slot n to slot n+1. For the transmission allocation containing resource 805, the transmitter UE can be requested to repeat the transmission block in four sub-resources from slot n+2 to slot n+3.

The above methods and examples can also be applied to single-carrier waveform-based system. The only difference is that one resource would occupy the whole spectrum of one band.

In one embodiment, some symbols in one resource are used for Automatic Gain Control (AGC) purpose. In one method, the first symbol in one resource can be used for AGC. In one method, the first symbol of in each sub-resource can be used for AGC. Some symbol in one resource can be used as GAP symbol. The transmitter UE can be requested to not transmit data on the GAP symbol. In one method, the last symbol in the last sub-resource in one resource can be used as the GAP symbol. In one method, the last symbol in every sub-resource in one resource can be used as the GAP symbol.

In one method, one resource can contain multiple sub-resources that are continues in the time domain. The first symbol in the first sub-resource in this resource can be used for AGC. The first symbol in each of sub-resource in this resource can be used for AGC. The last symbol in the last sub-resource in this resource can be used as GAP symbol. The last symbol in every sub-resource can be used as the GAP symbol.

In one method, one resource can contain multiple sub-resources that are non-adjacent in the time domain and they are scattered in the time domain. The first symbol in every sub-resource in this resource can be used for AGC and the last symbol in every sub-resource in this resource can be used as the GAP symbol.

In some embodiment, the resource can be configured with one or more of the following parameters or features: Number of PRBs in frequency domain if in multi-carrier based (e.g., OFDM-based, DFT-s-OFDM based); The total number of symbols in one resource; The number of sub-resources in one resource and the number of symbols in one sub-resource; The indices of symbols occupied by each sub-resource; The slot indices for one resource. It can be configured with the starting slot and the number of slots per resource in the time domain; The location of AGC symbol(s) and GAP symbol(s).

The transmitter UE can be configured with the above configuration parameters for resource. The transmitter UE can be requested to choose one or more resource for transmitting one transmission block. The transmitter UE can be requested to repeat the transmission block on those sub-resources. The transmitter UE can apply different transmit beamforming direction on different sub-resources. The transmitter UE can be requested to apply same transmit beamforming direction on different sub-resources. One-bit information can be used to indicate such configuration. The value of one-bit can be on and off to indicate whether a same or different beamforming are applied to different sub-resources.

The receiver UE can be configured with the above configuration parameters for receiving the transmission block in a sidelink channel. The receiver UE can assume that transmission block is repeated in multiple sub-resources. The UE can be configured to assume that different transmit beamforming can be applied on different sub-resources so that the receiver UE can not use the DMRS across sub-resources to estimate the channel. The UE can be configured to assume that same transmit beamforming can be applied on different sub-resources. The receiver UE can be requested to apply different receive beamforming on different sub-resources to receive the transmission block in one resource.

Scheduling Assignment and Data Channel Transmission on Multi-Beam-Based Sidelink In some embodiment, the UE can be requested to transmit and repeat the sidelink SA (schedule assignment or schedule allocation) and extended PSCCH (xPSSCH) in every sub-resource of one resource. In OFDM-based or Discrete Fourier Transform-spread Orthogonal Frequency Domain Modulation (DFT-s-OFDM) based system, a UE can be allocated with one or more resources. Those resource occupy the same symbols but different PRBs in frequency domain. The UE can be requested its sidelink SA and xPSSCH in every sub-resource of allocation in the time domain.

Figure 9:
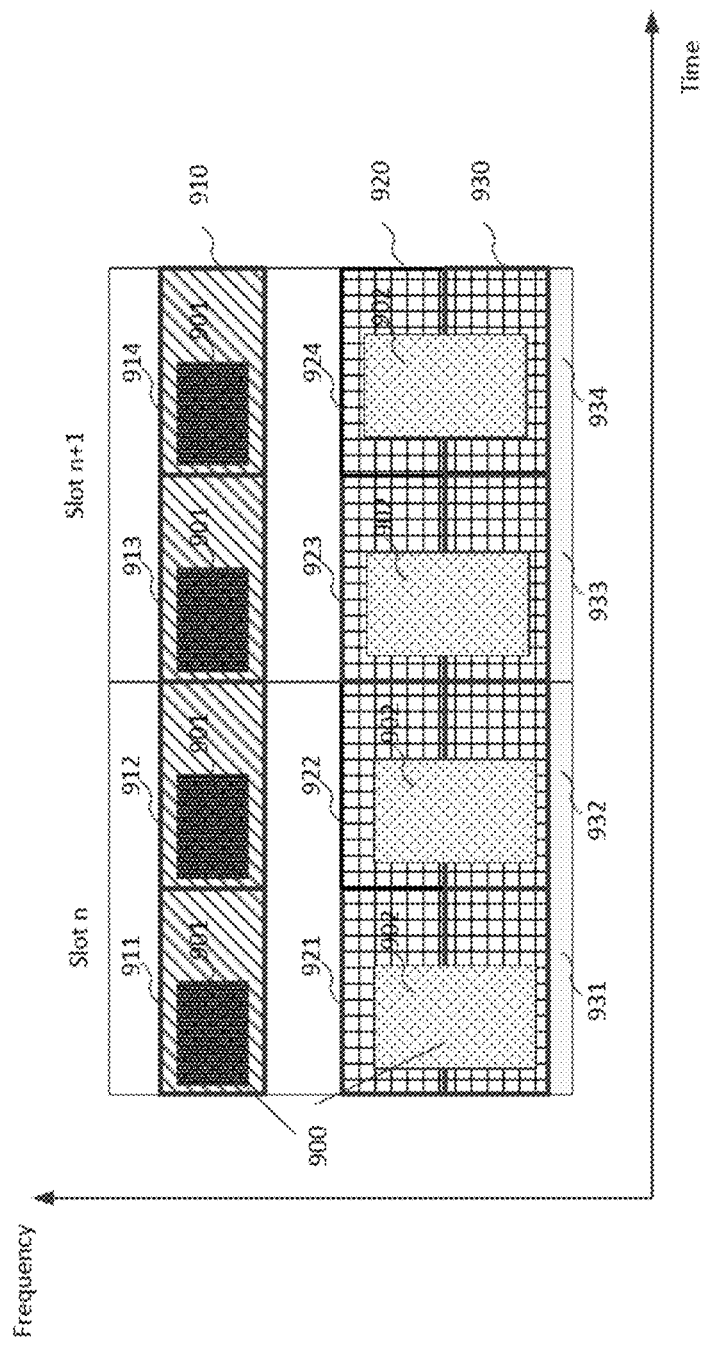
FIG. 9 illustrates an example method of schedule allocation (SA) and extended PSSCH (xPSSCH) transmission and mapping in sub-resource-based resource allocation according to one embodiment of this disclosure.

FIG. 9 illustrates an example method of SA and xPSSCH transmission and mapping in sub-resource-based resource allocation according to one embodiment of this disclosure. The embodiment shown in FIG. 9 is for illustration only. Other embodiments could be used without departing from the scope of the present disclosure.

One UE has a transmission 900 containing SA 901 and xPSSCH 902. The UE can be allocated with resource 910 for the transmission of SA 901. Resource 910 has four sub-resources 911~914 in slot n and slot n+1. The UE can be requested to repeat the SA 901 in all four sub-resources in resource 910. As illustrated in FIG. 9, the SA 901 is transmitted and repeated in sub-resource 911, 912, 913 and 913. The UE can be allocated with resource 920 and 930 for the transmission of xPSSCH 902. Resource 920 and 930 occupies different PRBs at slot n and slot n+1. The transmitter UE can be requested to transmit xPSSCH 902 on the REs in sub-resource 921 and 931, repeat xPSSCH 902 on the REs in sub-resources 922 and 932, repeat xPSSCH 902 on the REs in sub-resources 923 and 933 and repeat xPSSCH 902 on the REs in sub-resources 924 and 934.

The receiver UE can be requested to assume that one SA 901 are transmitted 4 times. One copy of SA 901 is sent in 911, one copy of SA 901 is sent in 912, One copy of SA 901 is sent in 913 and One copy of SA 901 is sent in 914. The receiver UE can be requested to assume that one xPSSCH 902 is sent in 921 and 931, one xPSSCH 902 is sent in 922 and 932, one xPSSCH 902 is sent in 923 and 933 and one xPSSCH 902 is sent in 924 and 934. In one method, the SA 901 sent in sub-resource 911 can be used to indicate the xPSSCH transmitted in 921 and 931, the SA 901 sent in sub-resource 912 can be used to indicate the xPSSCH transmitted in 922 and 932, the SA 901 sent in sub-resource 913 can be used to indicate the xPSSCH transmitted in 923 and 933, and the SA 901 sent in sub-resource 914 can be used to indicate the xPSSCH transmitted in 924 and 934.

In some embodiment, the UE can be requested to transmit and repeat the sidelink SA (schedule assignment or schedule allocation) and xPSSCH in every sub-resource of one resource. In single-carrier waveform based system, a UE can be allocated on resource. The UE can be requested its sidelink SA and/or xPSSCH in every sub-resource of allocation in the time domain.

FIG. 10A illustrates an example method of SA and xPSSCH transmission and mapping in sub-resource-based resource allocation according to one embodiment of this disclosure. The embodiment shown in FIG. 10A is for illustration only. Other embodiments could be used without departing from the scope of the present disclosure.

One UE can be scheduled to transmit SA 801 and xPSSCH 802 in one resource 801. The resource 801 has four sub-resource in the time domain. The transmitter UE can apply different beamforming on those four sub-resources as configured. As illustrated in FIG. 8, both SA 801 and xPSSCH 802 are transmitted in every sub-resource. The transmitter UE can be requested to repeat the SA 802 and xPSSCH 802 in all the sub-resources in resource 810. The receiver UE can be requested to only decode SA 801 and xPSSCH 802 from one sub-resource. The receiver UE can be requested to assume that different transmit beamforming vectors are applied to different sub-resources in resource 810. If configured, the receiver UE can be requested to assume that same transmit beamforming vector is applied to all four sub-resources in resource 810.

FIG. 10B illustrates an example method of SA and xPSSCH transmission and mapping in sub-resource-based resource allocation according to one embodiment of this disclosure. The embodiment shown in FIG. 10B is for illustration only. Other embodiments could be used without departing from the scope of the present disclosure.

One UE can be scheduled to transmit SA 1001 and xPSSCH 1002 in one resource 1020. The resource 1020 has five sub-resources in the time domain, which are 1021, 1022, 1023, 1024 and 1029. The sub-resources 1021, 1022, 1023 and 1024 are normal sub-resource and sub-resource 1029 can be considered as a special sub-resources. The SA 1001 is transmitted in sub-resource 1029 and the xPSSCH 1002 is transmitted in sub-resources 1021, 1022, 1023 and 1024. The xPSSCH 1002 is repeated in sub-resources 1021, 1022, 1023 and 1024. The transmitter UE can be requested to transmit SA 1001 on the symbols in sub-resource 1029. The transmitter UE can be requested to transmit and repeat the xPSSCH 1002 in sub-resources 1021, 1022, 1023 and 1024. The transmitter UE can be requested to apply different or same beamforming vectors on sub-resources 1021, 1022, 1023 and 1024 as configured by the system.

In some embodiment, the SCI format transmitted in SA can contain one or more of the following information. The beam sweeping information, whether beam sweeping operation is applied on sub-resources and whether the transmitter UE applies same or different beamforming directions on different sub-resources. The number of re-sources where the scheduled xPSSCH is transmitted and repeated.

Channel Sensing and Resource Selection in Multi-Beam Based Sidelink

In some embodiment, one receiver UE can be requested to measure a reference signal received power (RSRP) or received signal strength indicator (RSSI) or energy of resource with multiple time-domain sub-resource supporting beam sweeping transmission and do the resource selection based on the RSRP or RSSI or energy of resources. The UE can be requested to use the RSRP/RSSI/signal energy to calculate the resource selection for transmission.

In one method, the UE can be requested to calculate the RSRP of one resource l as follows: 1) As configured, the UE can partition one resource l into N sub-resources. 2) The UE measures the RSRP of each sub-resources for example by measuring the DMRS contained in each sub-resource and they are $\{RSRP_1, RSRP_2, \ldots, RSRP_N\}$. 3) Then the RSRP of resource l, $P_l$, can be calculated by one of the followings:

$$P_l = \max_{m=1,2,\ldots,N} RSRP_m; P_l = \frac{1}{N}\sum_{m=1}^{N} RSRP_m;$$

$$P_l = \max\left\{\frac{2}{N}\sum_{m=1}^{N/2} RSRP_m, \frac{2}{N}\sum_{m=1+N/2}^{N} RSRP_m\right\};$$

or $P_l$=median of $\{RSRP_1, RSRP_2, \ldots, RSRP_N\}$. 4) Then the UE can be requested to use the calculated RSRP of those resources in the resource selection.

In one method, the UE can be requested to measure the RSRP/reference signal received quality (RSRQ)/signal energy of one particular part of one resource and the RSRP/RSRQ/signal energy of that resource is defined as the RSRP/RSRQ/signal energy measured from that particular part. In one example, the UE can be requested to measure the RSRP/RSRQ/signal energy of the first sub-resource in one resource and the RSRP/RSRQ/signal energy of that resource is defined as the RSRP/RSRQ/signal energy measured from the first sub-resource. In one example, the UE can be requested to measure the RSRP/RSRQ/signal energy of the last sub-resource in one resource and the RSRP/RSRQ/signal energy of that resource is defined as the RSRP/RSRQ/signal energy measured from the last sub-resource. In one example, the UE can be requested to measure the RSRP/RSRQ/signal energy of the special sub-resource (for example where SA is sent) in one resource and the RSRP/RSRQ/signal energy of that resource is defined as the RSRP/RSRQ/signal energy measured from the special sub-resource (for example where SA is transmitted) in one resource.

In one method, the UE can be requested to fix the receive beam within one resource. The UE can be requested to change the Rx beam within one resource and the UE can apply different Rx beams on different sub-resources within one resource. In some method, the UE can be requested to use Omni antenna when measuring the RSRP of resource for resource selection.

In one embodiment, the UE can be requested to apply different RSRP (RSRQ, signal energy) methods on resources with Tx beam sweeping and resources without Tx beam sweeping. The UE can be configured to figure out the RSRP (RSRQ, signal energy) calculation method according to the Tx beam sweeping configuration for one resource. The receiver UE can first calculate the Tx beam sweeping configuration information for one resource (for example, the transmitter UE can apply Tx beam sweeping on sub-resources in one resource, and the transmitter UE can apply one same Tx beam on different sub-resources in one resource.). Then the receiver UE calculates the RSRP (RSRQ, signal energy) method based on the calculated Tx beam sweeping configuration.

In one method, if no Tx beam sweeping is applied on sub-sources in one resource and/or the transmitter UE applies one same Tx beam on the sub-resources in one resource, the UE can be requested to measure and calculate the RSRP (RSRQ, signal energy) by one of the followings and other methods described in this disclosure. The UE can measure the RSRP (RSRQ, signal energy) of one particular sub-resource in that resource and the RSRP measurement of that resource is the RSRP (RSRQ, signal energy) measured from that particular sub-resource. The particular sub-resource can be one resource configured by the NW, or defined in spec or selected by the receiver UE. The UE can be requested to calculate the RSRP (RSRQ, signal energy) measurement of one resource to be the averaged RSRP (RSRQ, signal energy) of some or a subset or all the sub-resources in that resource.

In one method, if Tx beam sweeping is applied on sub-resources in one resource and/or the transmitter UE can apply different Tx beams on the sub-resources in one resource, the receiver UE can be requested to measure and calculate by one of the method described in this disclosure.

DMRS For Multi-Beam Based Sidelink Transmission

In some embodiment, the transmitter UE can transmit DMRS signals in all the sub-resources in one resource and the transmitter UE can transmit DMRS signals in one or a subset of sub-resources in one resource. The receiver UE can be configured with the DMRS configuration in one resource with multiple sub-resources and use the DMRS to estimate the channel according to the DMRS configuration information.

In one method, the transmitter can transmit DMRS signal in all the sub-resources in one resource. The receiver UE can be configured to do one or more of the followings. The receiver UE can only use the DMRS contained in one sub-resource to estimate the channel and then apply the channel estimation on the decoding of signal in the same sub-resource. The receiver UE can assume the one same Tx beam(s) can be applied to all the DMRS signal in all the sub-resources in one resource. The sub-resources in one resource can be partitioned into Q subsets. The receiver UE can assume the one same Tx beams can be applied to the sub-resources within on subset but different Tx beams can applied to different subset.

Figure 11A:
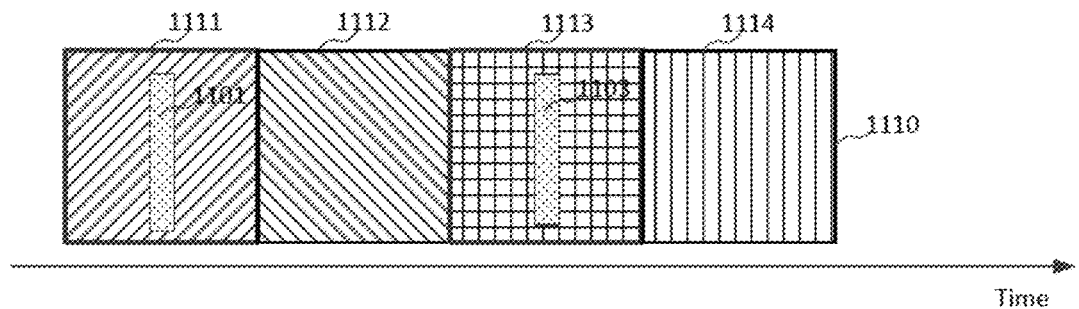
FIGS. 11A, 11B and 11C illustrate exemplary methods of DMRS in resource with multiple sub-resources according to embodiments of this disclosure.
Figure 11B:
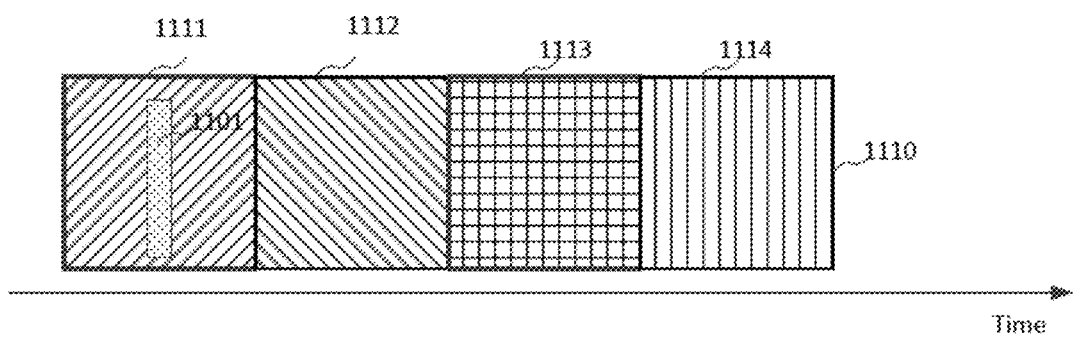
Figure 11C:
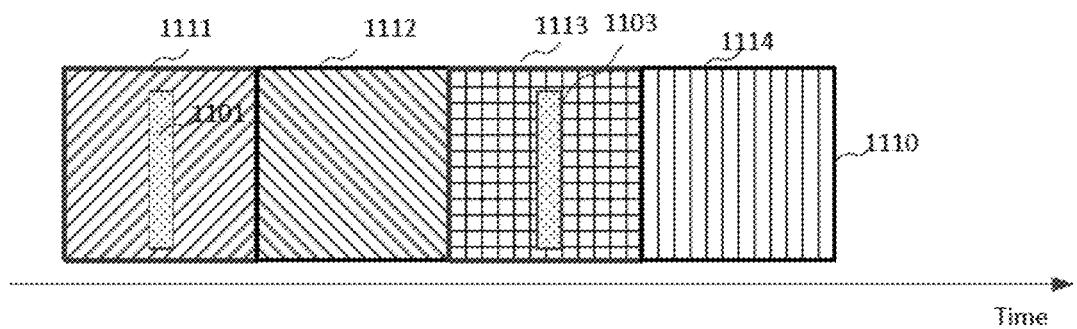

FIGS. 11A, 11B and 11C illustrate exemplary methods of DMRS in resource with multiple sub-resources according to embodiments of this disclosure. The embodiments shown in FIGS. 11A, 11B and 11C are for illustration only. Other embodiments could be used without departing from the scope of the present disclosure.

In FIG. 11A, resource 1110 has 4 sub-resources 1111~1114. DMRS signals are transmitted in all 4 sub-resource. DMRS signal 1101 is transmitted in sub-resource 1111. DMRS signal 1102 is transmitted in sub-resource 1112. DMRS signal 1103 is transmitted in sub-resource 1114 and DMRS signal 1104 is transmitted in sub-resource 1114.

In one example of FIG. 11B, resource 1110 has 4 sub-resources 1111~1114. DMRS signals are transmitted only one sub-resource but not in other 3 sub-resource. In the example, DMRS signal 1101 is transmitted in sub-resource 1111 and no DMRS signals are in sub-resource 1112~1114.

In one example of FIG. 11C, resource 1110 has 4 sub-resources 1111~1114. DMRS signals are transmitted only in two sub-resources but not in other 2 sub-resource. In the example, DMRS signal 1101 is transmitted in sub-resource 1111 and DMRS signals 1103 are sent in sub-resource 1113 and no DMRS signals are in sub-resources 1112 and 1114.

In one embodiment, the DMRS configuration can be used to indicate the configuration of Tx beam sweeping assumption. In one example, the DMRS can be only sent in one sub-resource, for example the first sub-resource in one resource. In this case, the receiver UE can assume that the transmitter UE can apply same Tx beam(s) on all the sub-resources in one resource. In one example. The DMRS is sent in all the sub-resources in one resource and the receiver UE can assume that the transmitter UE can apply different Tx beams on different sub-resources in one resource.

In the following description, the methods of resource allocation and selection for sidelink and V2X are proposed.

Resource Allocation

In some embodiment, the UE can be configured with two resource pools for transmission on a sidelink channel and each of these resource pool can be associated with driving direction of the vehicle. The UE can be configured with different rules on how to resource sensing and selection on each of these two resource pools.

In one method, the UE can be configured with a first resource pool and a second resource pool. A first resource pool and second resource pool can occupy different subset of slots. A first resource pool and a second resource pool can occupy same subsets of slots but different subsets of PRBs in each slot. They can also occupy different slots and different PRBs. A first resource pool can be associated with a subset of vehicle driving direction and a second resource pool can associated with a subset of vehicle driving direction.

Figure 12:
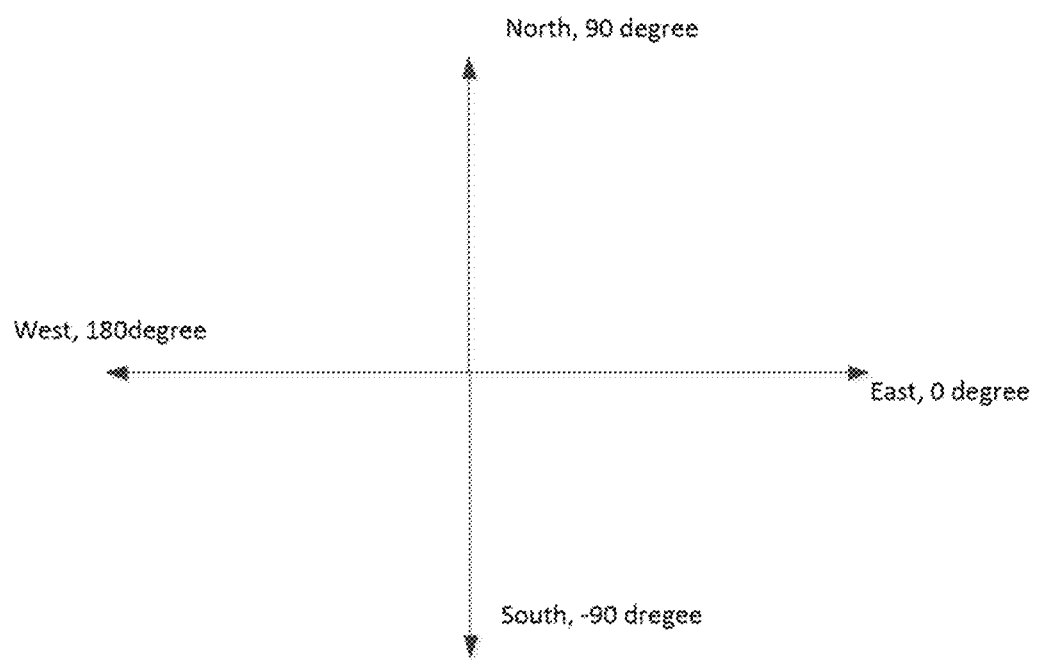
FIG. 12 illustrates exemplary reference directions to be used for vehicle driving directions according to one embodiment of the present disclosure.

FIG. 12 illustrates exemplary reference directions to be used for vehicle driving directions according to one embodiment of the present disclosure. The embodiment shown in FIG. 12 is for illustration only. Other embodiments could be used without departing from the scope of the present disclosure.

In one embodiment, the east direction is defined as 0 degree as reference direction, as shown in FIG. 12. Then the north, south and west directions are defined as 90 degree, −90 degree and 180 degree, respectively. A first resource pool can be associated with driving directions within 0 degree to 180 degree and a second resource pool can be associated with driving direction within −180 degree to 0 degree. In one example, a first resource pool can be associated with driving directions within −90 degree to 90 degree and a second resource pool can be associated with driving direction within −180 degree to −90 degree and within 90 degree to 180 degree.

In one method, the UE can be requested to select resource for transmission from a first resource pool and a second resource pool according to its driving direction and the configured association between resource pool and vehicle driving direction. A first resource pool can be associated with a first direction range and a second resource pool can be associated with a second direction range. The UE can be configured with the resource selection rule in a first resource pool and in a second resource pool. The UE can be requested to calculate its driving direction and calculate which direction range its driving direction falls into. Then the UE can select resource from a first resource pool and/or a second resource pool based on its driving direction and configured rule. The UE can be requested to monitor and update its driving direction and then update the resource and resource pool selection.

Figure 13:
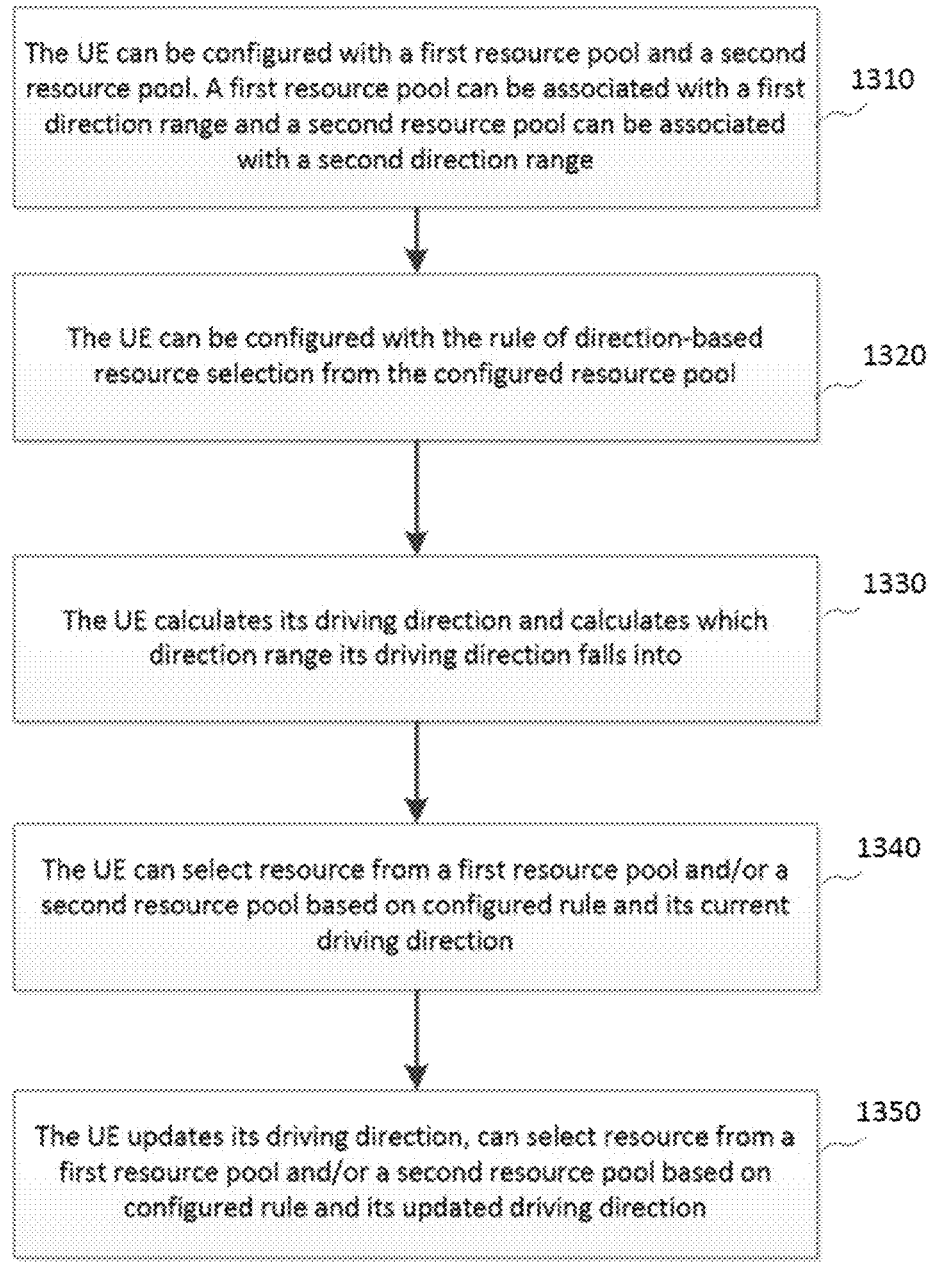
FIG. 13 illustrates an exemplary procedure of UE selecting resource based on vehicle driving directions according to embodiments this disclosure.

FIG. 13 illustrates an exemplary procedure of UE selecting resource based on vehicle driving directions according to embodiments this disclosure. The embodiment shown in FIG. 13 is for illustration only. Other embodiments could be used without departing from the scope of the present disclosure.

A UE can be configured with a first resource pool and a second resource pool. A UE can be configured with the association between a first direction range and a first resource pool, the association between a second direction range and a second resource pool 1310. Such configuration can be signaled from NW through some high level signaling (e.g., RRC configuration, system information message). Such configuration can be pre-defined. The UE can be configured with the resource selection rule based on driving direction that can be used by the UE to select from a first resource pool 1320. The UE can be configured with the resource selection rule based on driving direction that can be used by the UE to select from a second resource pool 1320. At 1330, the UE can calculate its driving direction and then calculate which direction range its driving direction falls into. Based on the configured resource selection rule and its driving direction, the UE can be requested to select resource for transmission from a first resource pool and/or a second resource pool 1340. The UE can keep monitoring its driving direction and updates its driving direction. The UE can select resource from a first resource pool and/or a second resource pool based its updated driving direction 1350.

In one example the UE can be configured with a first resource pool and a second resource pool. A first resource pool can be associated with driving directions within 0 degree to 180 degree and a second resource pool can be associated with driving direction within −180 degree to 0 degree. The UE can be requested to first sense the resource pool of which the associated driving direction range the driving direction of this UE falls into. If some resources within that resource pool meet the selection criterion, the UE can be requested to select one qualified resource for the transmission. If no resource within that resource pool meeting the selection criterion can be found, the UE can be requested to sense another resource pool and the UE can select one resource that met the selection criterion.

Figure 14:
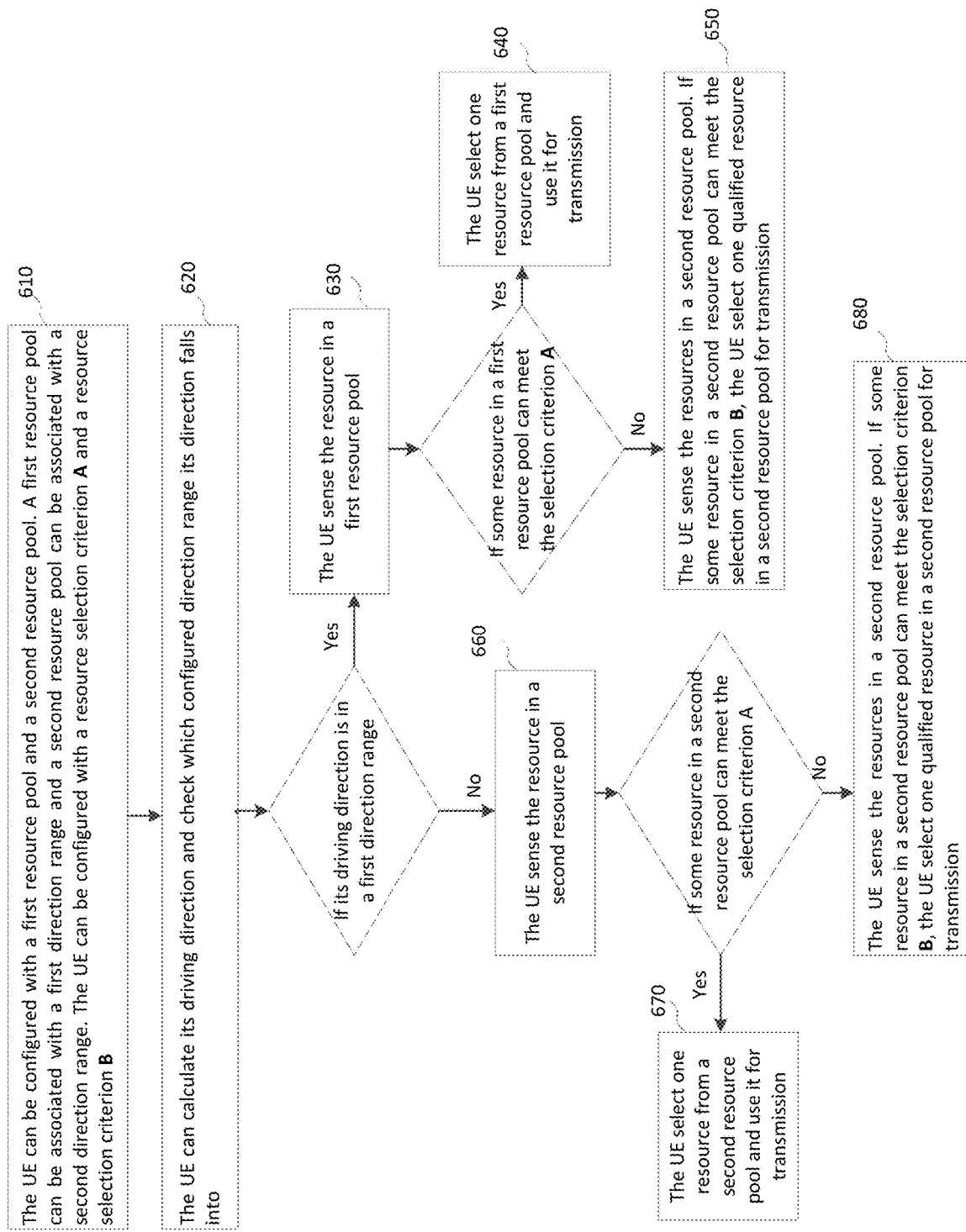
FIG. 14 illustrates a procedure of UE selecting resource based on vehicle driving direction according to one embodiment of this disclosure.

FIG. 14 illustrates a procedure of UE selecting resource based on vehicle driving direction according to one embodiment of this disclosure. The embodiment shown in FIG. 14 is for illustration only. Other embodiments could be used without departing from the scope of the present disclosure.

A UE can be configured with a first resource pool and second resource pool. A UE can be configured with the association between a first direction range and a first resource pool, the association between a second direction range and a second resource pool 1410. The UE can be configured with a resource selection criterion A and a resource selection criterion B 1410. The UE can calculate its driving direction and check which configured direction range (a first direction range or a second direction range) its driving direction falls into 1420. If its driving direction falls into a first direction range, the UE can sense a first resource pool 1430. If some resources in a first resource pool can meet the selection criterion A as configured, the UE can select one resource that meets the selection criterion A from a first resource pool for transmission 1440. If no resources in a first resource pool can meet the selection criterion A as configured, the UE can go ahead to sense the resources defined in a second resource pool and then select one resource that can meet the selection criterion B in a second resource pool for transmission 1450. If its driving direction does not fall into a first direction range, the UE can sense a second resource pool 1460. If some resources in a second resource pool can meet the selection criterion A as configured, the UE can select one resource that meets the selection criterion A from a second resource pool for transmission 1470. If no resources in a second resource pool can meet the selection criterion A as configured, the UE can go ahead to sense the resources defined in a first resource pool and then select one resource that can meet the selection criterion B in a first resource pool for transmission 1480.

In one method, different RSRP thresholds can be configured in the criterion A and criterion B. In one example, the RSRP threshold in criterion A is larger than the RSRP threshold in the criterion B.

In one method, the UE can be configured with a first resource pool and a second resource pool. In one example, a first resource pool can be associated with driving directions within 0 degree to 180 degree and a second resource pool can be associated with driving direction within −180 degree to 0 degree. The UE can be requested to calculate which resource pool can be used by this UE based on his driving direction. If the UE's driving direction falls into the driving direction range associated with a first resource pool, the UE can be requested to sense the resource in a first resource pool and only select the resource from a first resource pool for the transmission on a sidelink channel. If the UE's driving direction falls into the driving direction range associated with a second resource pool, the UE can be requested to sense the resource in a second resource pool and only select the resource from a first resource pool for the transmission on a sidelink channel.

Figure 15:
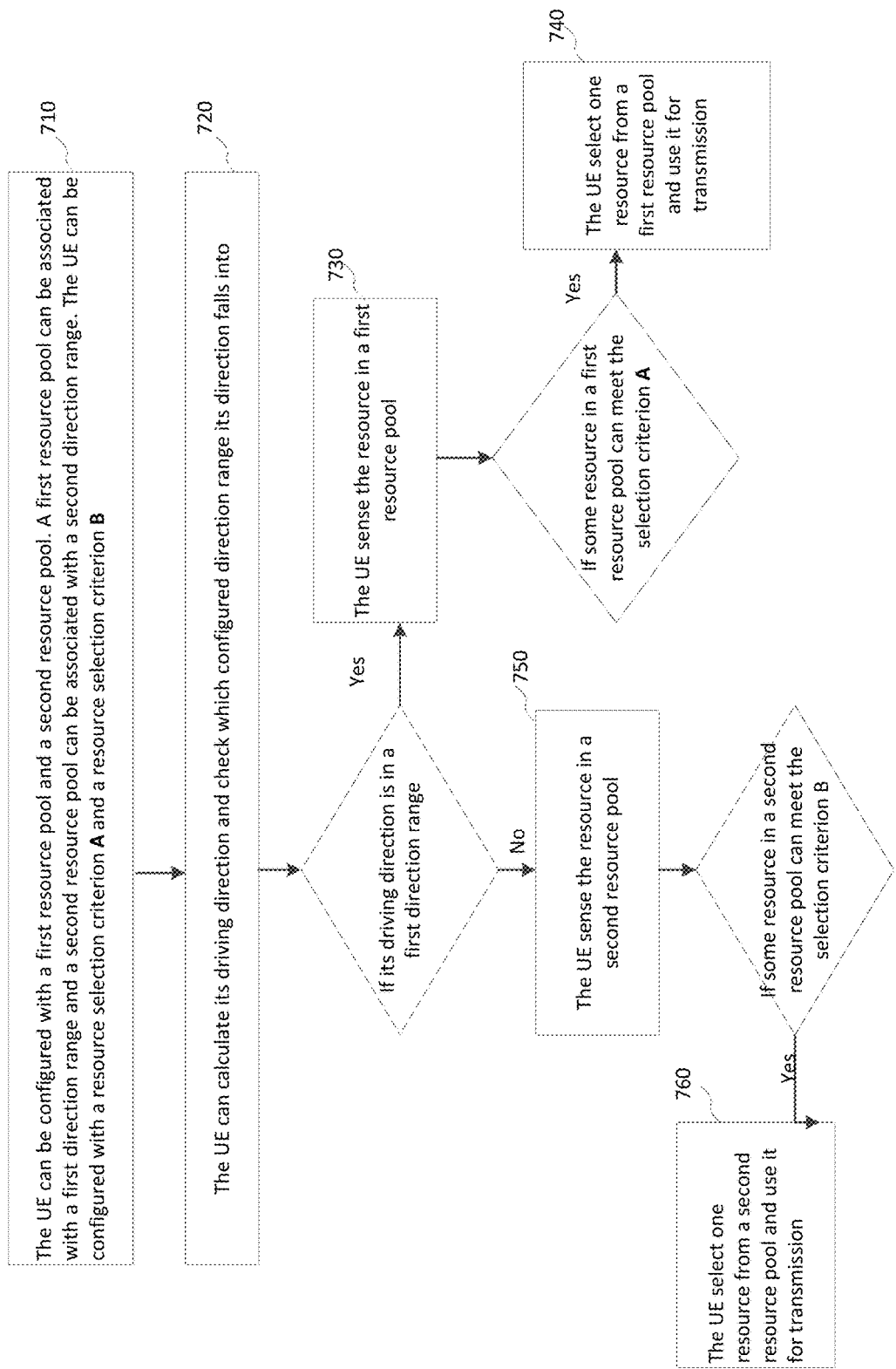
FIG. 15 illustrates an exemplary procedure of UE selecting resource based on vehicle driving direction according to one embodiment of this disclosure.

FIG. 15 illustrates an exemplary procedure of UE selecting resource based on vehicle driving direction according to one embodiment of this disclosure. The embodiment shown in FIG. 15 is for illustration only. Other embodiments could be used without departing from the scope of the present disclosure.

A UE can be configured with a first resource pool and second resource pool. A UE can be configured with the association between a first direction range and a first resource pool, the association between a second direction range and a second resource pool 1510. The UE can be configured with a resource selection criterion A and a resource selection criterion B 1510. The UE can calculate its driving direction and check which configured direction range (a first direction range or a second direction range) its driving direction falls into 1520. If its driving direction falls into a first direction range, the UE can sense a first resource pool 1530. If some resources in a first resource pool can meet the selection criterion A as configured, the UE can select one resource that meets the selection criterion A from a first resource pool for transmission 1540. If its driving direction does not fall into a first direction range, the UE can sense a second resource pool 1550. If some resources in a second resource pool can meet the selection criterion A as configured, the UE can select one resource that meets the selection criterion A from a second resource pool for transmission 1560.

In some embodiments, the UE can be requested to report the driving direction to the NW. In one method, the UE can be requested to report the driving direction to the NW periodically. Two direction range can be configured to the UE, a first direction range and a second direction range. The UE can report 1 bit to the NW to indicate which direction range its driving direction falls into. In one example, a first direction range is defined as from 0 degree to 180 degree and a second direction range is defined as from −180 degree to 0 degree. If the driving direction is within 0 degree to 180 degree, the UE can report 0 to the NW. If the driving direction is within −180 degree to 0 degree, the UE can report 1 to the NW. In one method, the UE can be requested to trigger an uplink reporting to report the current driving direction when the driving direction is changed from one direction range to another direction range.

In some embodiments, the UE can be requested to report the information of Transmit antennas that he is going to use for the data transmission. In one method, the UE can be requested to report which transmit antenna (front antenna or rear antenna) that he is going to use for the requested data transmission. In one method, the UE can be requested to report which transmit antenna (front antenna or rear antenna) that he is going to use for the data transmission in the next time duration, for example until next notification/report from the UE.

In one embodiment, the UE can be configured with two resource pools for transmission on a sidelink channel and each of these resource pool can be associated with driving direction of the vehicle and transmit antenna that the vehicle would use to transmit. The UE can be configured with different rules on how to resource sensing and selection on each of these two resource pools.

In one method, the UE can be requested to select resource for transmission from a first resource pool and a second resource pool according to its driving direction and its transmit antenna used for the transmission and the configured association between resource pool and vehicle driving direction/transmit antenna used for the transmission. The UE can be configured with one or more of the following associations. A first resource pool can be associated with a first direction range and the front transmit antenna. A first resource pool can be associated with a second direction range and the rear transmit antenna. A second resource pool can be associated with a first direction range and the rear transmit antenna. A second resource pool can be associated with a second direction range and the front transmit antenna The UE can be configured with the resource selection rule in a first resource pool and in a second resource pool. The UE can be requested to calculate its driving direction and calculate which direction range its driving direction falls into. Then the UE can select resource from a first resource pool and/or a second resource pool based on its driving direction, the transmit antenna he would use to transmit and configured rule. The UE can be requested to monitor and update its driving direction and transmit antenna he would use and then update the resource and resource pool selection.

Figure 16:
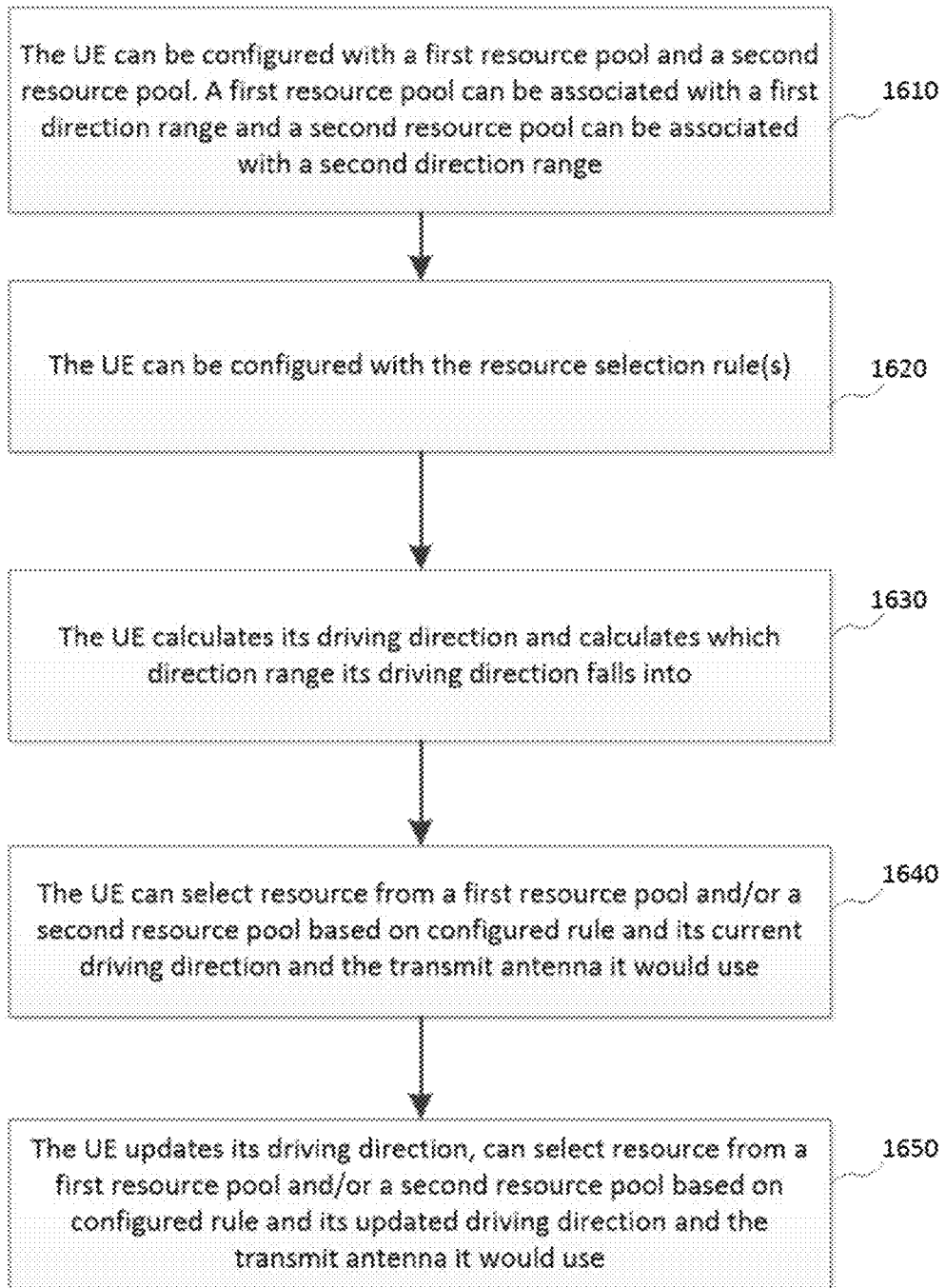
FIG. 16 illustrates an exemplary procedure of UE selecting resource based on vehicle driving direction and transmit antenna selection according to one embodiment of this disclosure.

FIG. 16 illustrates a procedure of UE selecting resource based on vehicle driving direction and transmit antenna selection according to one embodiment of this disclosure. The embodiment shown in FIG. 16 is for illustration only. Other embodiments could be used without departing from the scope of the present disclosure.

A UE can be configured with a first resource pool and second resource pool. A UE can be configured with the association between a first direction range and a first resource pool, the association between a second direction range and a second resource pool 1610. Such configuration can be signaled from NW through some high level signaling (e.g., RRC configuration, system information message). Such configuration can be pre-defined. The UE can be configured with the resource selection rule based on driving direction that can be used by the UE to select from a first resource pool 1620. The UE can be configured with the resource selection rule based on driving direction that can be used by the UE to select from a second resource pool 1620. At operation 1630, the UE can calculate its driving direction and then calculate which direction range its driving direction falls into. Based on the configured resource selection rule and its driving direction, the UE can be requested to select resource for transmission from a first resource pool and/or a second resource pool 1640. The UE can keep monitoring its driving direction and updates its driving direction. The UE can select resource from a first resource pool and/or a second resource pool based its updated driving direction 1650.

In some embodiment, the resource sensing, selection and reservation can be done by a group of UEs. In this method, all or a subset of UEs in one configured UE group can be requested to sense the resource in the configured resource pool. One UE in the configured UE group can be assigned as the leader of the group. The leader UE can be requested to select the resource based on the sensing results of the whole UE group. The use case for this method is the platooning.

Resource Selection Method

In some embodiment, the UE can be requested to measure the variation trend of energy of each resource (or subchannel) and then take into account the variation trend of energy measurement in the resource selection decision.

In one method, the UE can be requested to calcite the RSSI measurement metrics of resource k at slot n as follows.

1) The UE measures the RSSI of resource k at slots n−N, n−2×N, n−3×N, . . . , n−K×N; The RSSI measured from resource k at slot n−N is $RSSI_1$. The RSSI measured from resource k at slot n−2×N is $RSSI_2$. The RSSI measured from resource k at slot n−3×N is $RSSI_3$. The RSSI measured from resource k at slot n−K×N is $RSSI_K$.

2) The UE can calculate an averaged RSSI as:

$$AveRSSI = \frac{RSSI_1 + RSSI_2 + \ldots + RSSI_N}{N}$$

3) The UE can calculate the slop of function of RSSI vs time. The UE can assume the RSSI is linear function of slot index $RSSI=\alpha \times l + RSSI_0$, where l is n−K×N, n−(K−1)×N, n−(K−2)×N, . . . , n−N. The UE can be requested to estimate the value of α.

4) Then the UE can calculate one effective RSSI for resource k at slot m by:

EffRSSI=AveRSSI+Δ×α

The parameter Δ can be signaled through some high level signaling from the NW. The parameter Δ can be predefined in specification.

5) Then the UE can sort the resources in selection window based on the effective RSSI: EffRSSI.

6) The UE can exclude the resources with the highest effective RSSI, EffRSSI so that at least x % resources are remained in the selection window.

The advantage of this embodiment is to take into account the movement of vehicles.

In this following description, the methods of re-transmission and acknowledge feedback transmission for sidelink and V2X are proposed.

Feedback Channel Design for Transmission on Sidelink

In some embodiment, a UE can be configured with a feedback channel on a sidelink channel and the UE can be requested to send the proper feedback information according to the decoding of corresponding PSCCH and PSSCH transmission(s). The receiver UE can be requested to report that the PSSCH transmission is correctly decoded through the configured feedback channel. The receiver UE can be requested to report that the PSSCH transmission is not correctly decoded though the configured feedback channel. The receiver UE can be requested to report that the PSCCH transmission is not correctly decoded though the configured feedback channel.

In one method, a feedback channel can be configured for one PSCCH and PSSCH transmission and the UE can be requested to send proper feedback information on the configured feedback channel according to the decoding results of PSCCH and PSSCH. The receiver UE can be requested to report that the corresponding PSSCH transmission is correctly decoded through the configured feedback channel. The receiver UE can be requested to report that the corresponding PSSCH transmission is not correctly decoded though the configured feedback channel. The receiver UE can be requested to report that the corresponding PSCCH transmission is not correctly decoded though the configured feedback channel. The receiver UE can be requested to report that the corresponding PSCCH transmission is correctly decoded through the configured feedback channel.

In one method, a feedback channel can be configured for multiple PSCCH/PSSCH transmissions and the UE can be requested to send proper feedback information on the configured feedback channel according to the decoding results of corresponding associated PSCCH and PSSCH transmissions. The receiver UE can be requested to report that all the associated PSSCH transmissions are correctly decoded through the configured feedback channel. The receiver UE can be requested to report that none of the associated PSSCH transmissions is correctly decoded though the configured feedback channel. The receiver UE can be requested to report that at least one of the associated PSSCH transmissions are not correctly decoded through the configured feedback channel. The receiver UE can be requested to report that all the associated PSCCH transmissions are correctly decoded through the configured feedback channel. The receiver UE can be requested to report that none of the associated PSCCH transmissions is correctly decoded through the configured feedback. The receiver UE can be requested to report that at least one of the associated PSCCH transmissions is not correctly decoded.

In one method, the configuration of a feedback channel can be based on the slot and time/frequency location of one PSCCH transmission. The feedback channel corresponding to PSCCH sent in slot n and the corresponding PSSCH transmission scheduled by that PSCCH can be configured at slot n+k0. At slot n+k0, some time/frequency resources can be configured as feedback channel zone and the feedback channel zone can be further partitioned into N feedback channels. The UE can be requested to calculate the corresponding feedback channel location at slot n+k0 based on the PSCCH transmission location at slot n. In one example, the N feedback channels are indexed as $\{0, 1, 2, \ldots, N-1\}$ and the UE can be requested to use feedback channel indexed as i at slot n+k0 for the transmission of i-th PSCCH at slot n and PSCCH scheduled by this PSCCH.

In one method, some time/frequency resources at slot n+k0 can be configured as the feedback channel for all the PSCCH transmitted at slot n and the corresponding PSSCH scheduled by those PSCCH transmissions. The UE can be configured with a set of sequences, for example N ZC sequence, N M-sequences, or N PN sequences. Each of those sequence is associated with one PSCCH at slot n and corresponding PSSCH scheduled by that PSCCH. In one example, N sequences $\{s_1, s_2, \ldots, s_N\}$ can be configured and sequence $s_i$, i=1, 2, ..., N can be associated with i-th PSCCH transmitted at slot n and the corresponding PSSCH scheduled by that PSCCH. The UE can be requested to send sequence $s_i$, i=1, 2, ..., N for to report the information of decoding result of i-th PSCCH transmitted at slot n and/or the decoding results of the corresponding PSSCH scheduled by that PSCCH.

In one embodiment, the control signaling transmitted in one PSCCH can be used to indicate whether a feedback channel is configured for this PSCCH and/or the corresponding PSSCH scheduled by that PSCCH. The control signaling transmitted in one PSCCH, for example SCI format x, can indicate one or more of the following information. 1) The slot offset to indicate the slot location of a feedback channel corresponding to this PSCCH and PSSCH scheduled by this PSCCH. In one example, an L-bit field (for example, 1 bit, 2 bits, 3 bits) can be used to indicate a value of slot offset. The UE can be configured to calculate a value of slot offset based on the received L-bit field and then calculate the slot location for the corresponding feedback channel. 2) The information of time/frequency resource used for a feedback channel. 3) The ID of sequence associated with this PSCCH and the PSSCH scheduled by this PSCCH for the decoding result information. 4) A flag to indicate the presence and/or absence of feedback channel for the UE to report the information of decoding results. 5) The reporting content in feedback channel. The transmitter UE can indicate what kind of information the receiver UE can be requested to report in feedback channel. In one example, the UE can be requested to report that the associated PSCCH or PSSCH transmission(s) are not correctly decoded. In one example, the UE can be requested to report that the associated PSCCH and/or PSSCH transmission(s) are correctly decoded.

Receiver UE Feedback for Transmission on Sidelink

In one embodiment, one receiver UE can be requested to transmit a configured signal/sequence on a configured feedback channel when the PSSCH is not decoded correctly and one receiver UE can be requested to not transmit any signal on a configured feedback channel when the PSSCH is decoded correctly. In this method, a feedback channel can be configured to the PSCCH. The receiver UE can first decode PSCCH to find the allocation of PSSCH and then decode the PSSCH. If the PSSCH is not decoded correctly, the receiver UE can be requested to send a configured signal/sequence on the feedback channel corresponding to the PSCCH to notify the transmitter UE that this PSSCH transmission is not received correctly by one receiver. When the receiver UE decodes the PSSCH correctly, the UE can be requested to not transmit any signal on the configured feedback channel corresponding to the PSCCH. Through this method, the transmitter UE can detect the signal in feedback channel to FIG. out whether the PSSCH transmission is received correctly by all receivers or some receiver UEs fails the reception. Then the transmitter UE can determine the retransmission behavior.

Figure 17:
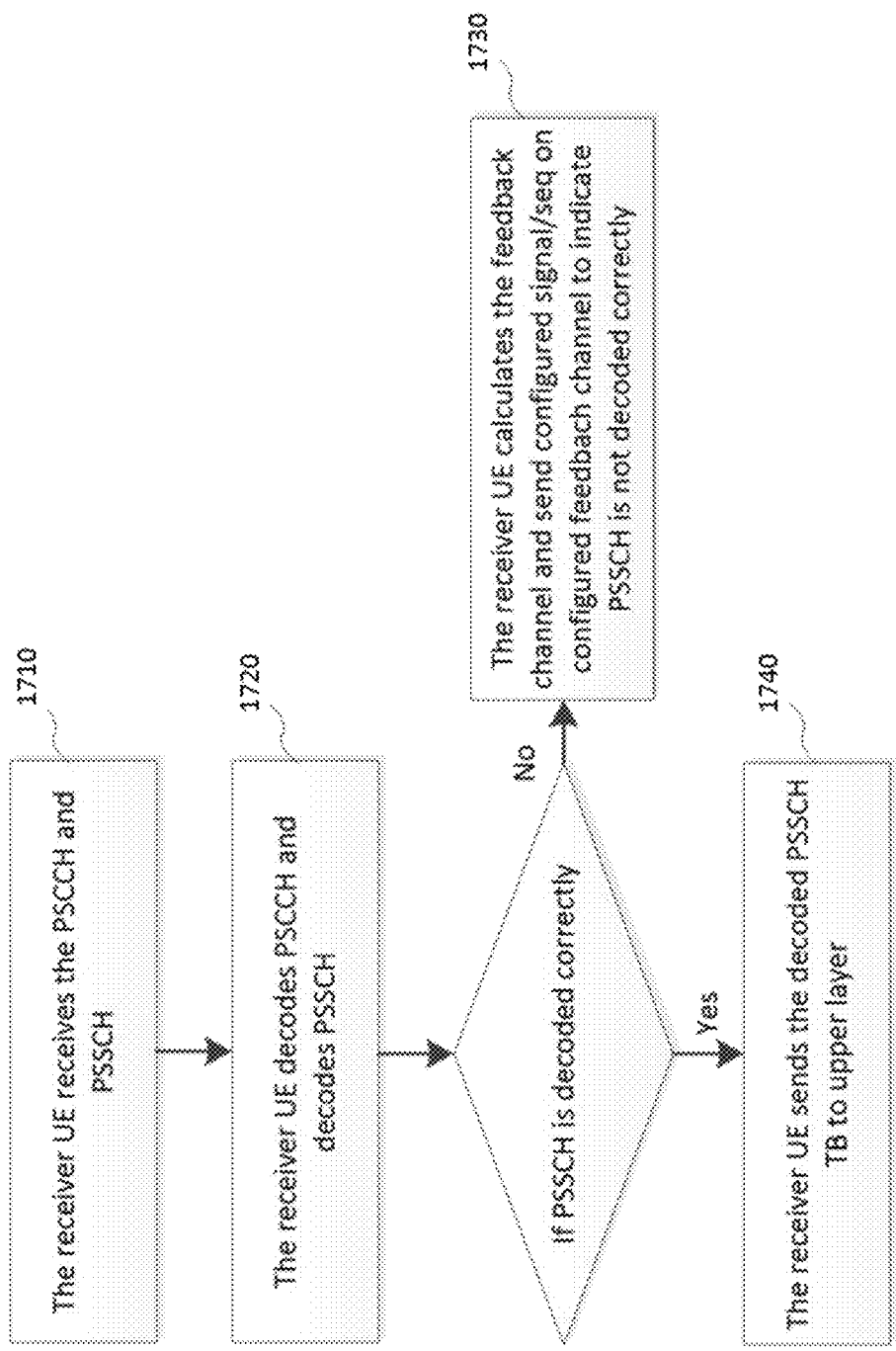
FIG. 17 illustrates a procedure of reporting failed decoding on PC5 link according to one embodiment of this disclosure.

FIG. 17 illustrates an exemplary procedure of reporting failed decoding on PC5 link according to one embodiment of this disclosure. The embodiment shown in FIG. 17 is for illustration only. Other embodiments could be used without departing from the scope of the present disclosure.

A receiver UE receives the PSCCH and PSSCH on a sidelink channel through PC5 interface 410. The receiver UE first decodes PSCCH to obtain the resource allocation information for PSSCH and then decodes the PSSCH in 1720. When the receiver UE does not decode TB in PSSCH correctly in slot 1730, the receiver UE can calculate the feedback channel based on the configuration of PSCCH and then send the configured signal/sequence on the feedback channel to indicate the transmitter UE that the PSSCH is not decoded correctly. If the receiver UE decodes TB in PSSCH correctly in slot 1740, the UE can send the decoded results to upper layer for further processing.

In one embodiment, one receiver UE can be requested to transmit a configured signal/sequence on a configured feedback channel when the PSSCH is not decoded correctly and one receiver UE can be requested to transmit a configured signal/sequence on a configured feedback channel when the PSSCH is decoded correctly. The feedback channel can be configured according to the location of corresponding PSCCH.

In one method, two feedback subchannels, a first feedback subchannel and a second feedback subchannel can be configured for one PSCCH. The receiver UE can be requested to send configured signal or sequence on one of these two feedbacks to indicate the decoding result of the PSSCH scheduled by that PSCCH. When the receiver UE decodes the PSSCH correctly, the UE can be requested to transmit a configured signal/sequence on a first feedback subchannel. When the receiver UE does not decode the PSSCH correctly, the UE can be requested to transmit a configured signal/sequence on a second feedback subchannel. Through this method, the transmitter UE can detect the signal in a first feedback subchannel and a second feedback subchannel to FIG. out whether the PSSCH transmission is received correctly by all receivers or some receiver UEs fails the reception. Then the transmitter UE can determine the re-transmission behavior.

In one method, a feedback channel and two sequences $\{s_1, s_2\}$ can be configured for one PSCCH. These two sequences $\{s_1, s_2\}$ can be orthogonal to each other. These two sequences $\{s_1, s_2\}$ can have low correlation. The receiver UE can be requested to send one of those two configured sequences $\{s_1, s_2\}$ to indicate the decoding result of the PSSCH scheduled by that PSCCH. When the receiver UE decodes the PSSCH correctly, the UE can be requested to transmit sequence $s_1$ on the feedback channel. When the receiver UE does not decode the PSSCH correctly, the UE can be requested to transmit sequence $s_2$ on the feedback channel. Through this method, the transmitter UE can detect the signals $\{s_1, s_2\}$ in feedback channel to FIG. out whether the PSSCH transmission is received correctly by all receivers or some receiver UEs fails the reception. Then the transmitter UE can determine the re-transmission behavior.

Figure 18A:
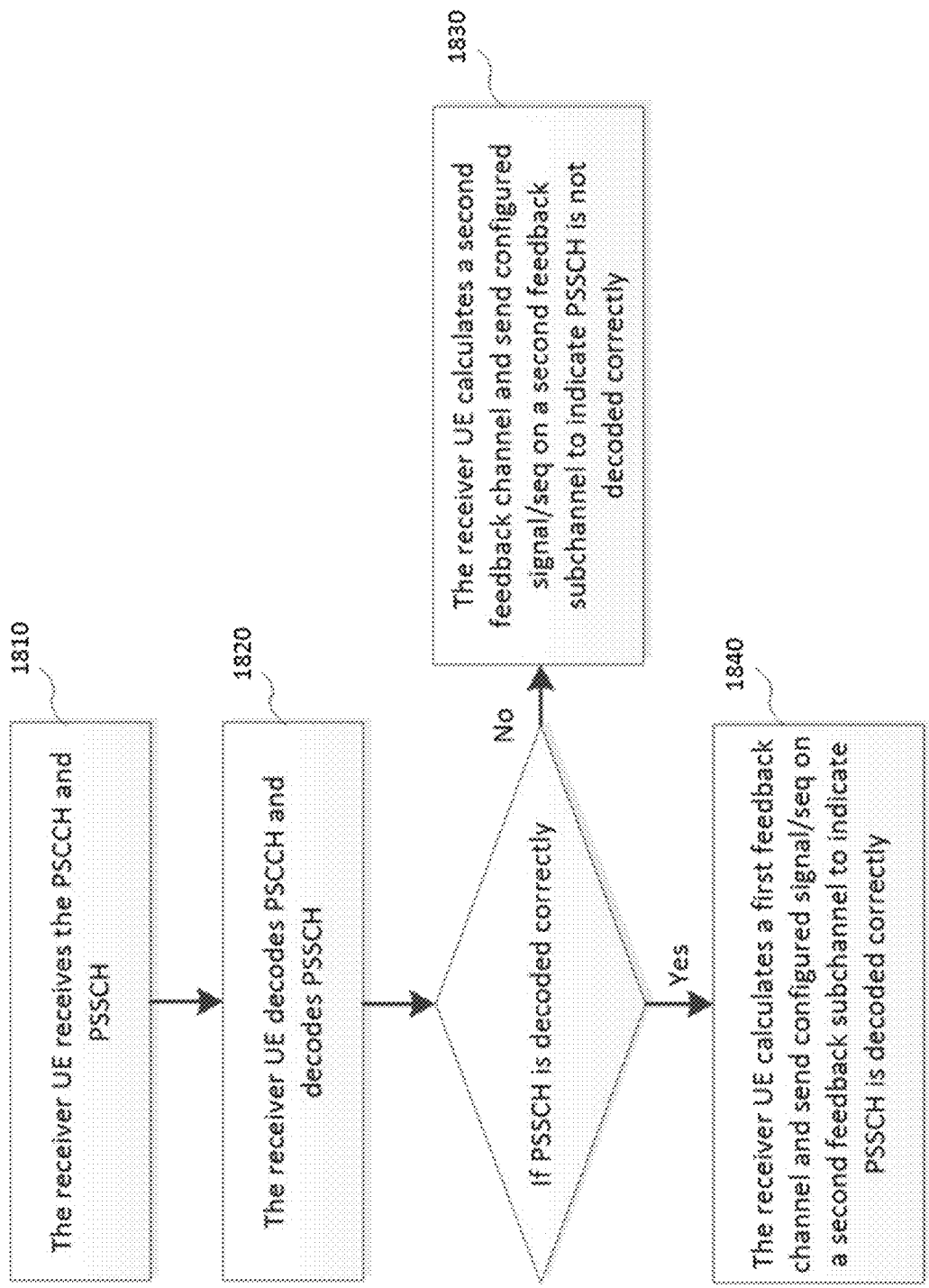
FIG. 18A illustrates an exemplary procedure of reporting failed decoding on PC5 link according to one embodiment of this disclosure.

FIG. 18A illustrates an exemplary procedure of reporting failed decoding on PC5 link according to one embodiment of this disclosure. The embodiment shown in FIG. 18A is for illustration only. Other embodiments could be used without departing from the scope of the present disclosure.

A receiver UE receives the PSCCH and PSSCH on a sidelink channel through PC5 interface 1810. The receiver UE first decodes PSCCH to obtain the resource allocation information for PSSCH and then decodes the PSSCH in 1820. When the receiver UE does not decode TB in PSSCH correctly in slot 1830, the receiver UE can calculate a second feedback subchannel based on the configuration of PSCCH and then send the configured signal/sequence on a second feedback subchannel to indicate the transmitter UE that the PSSCH is not decoded correctly. If the receiver UE decodes TB in PSSCH correctly in slot 1840, the receiver UE can calculate a first feedback subchannel based on the configuration of PSCCH and then send the configured signal/sequence on a first feedback subchannel to indicate the transmitter UE that the PSSCH is decoded correctly.

Figure 18B:
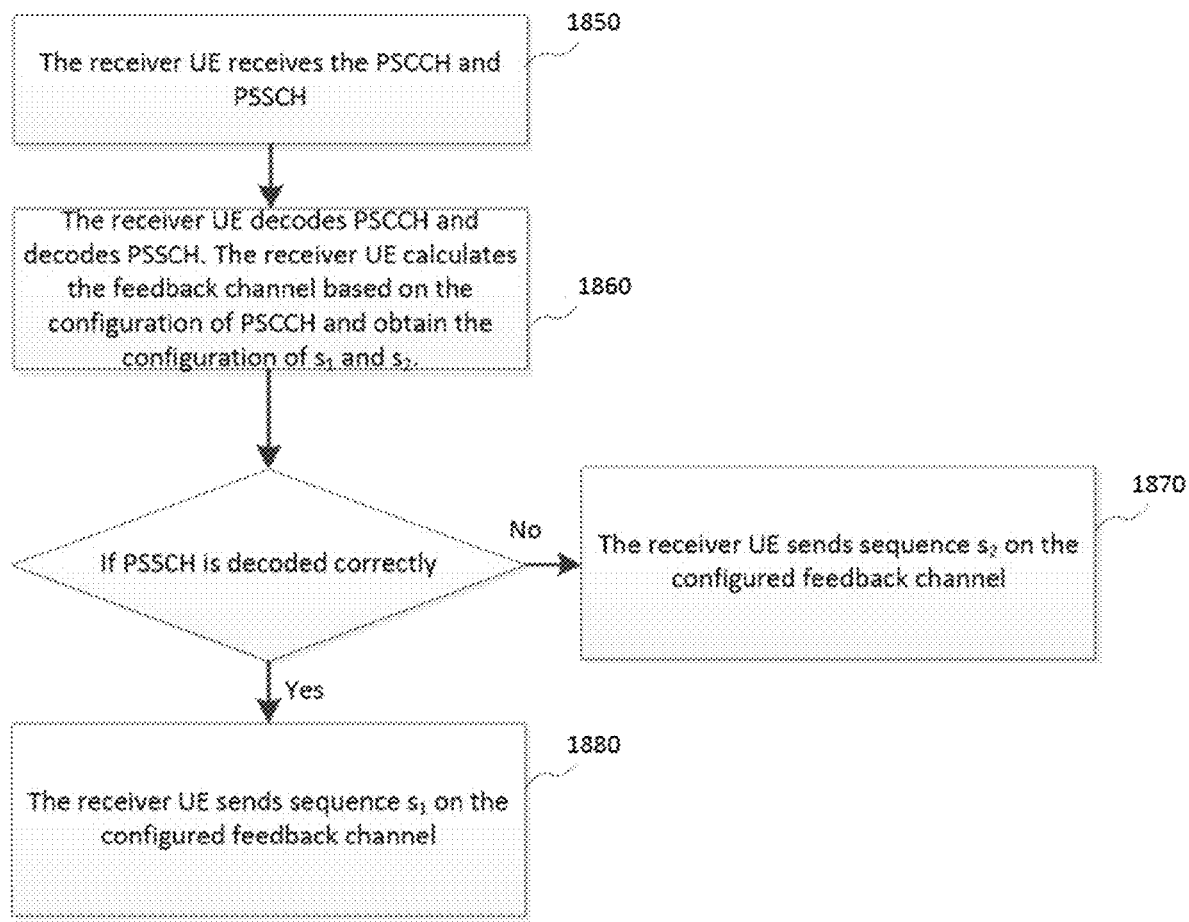
FIG. 18B illustrates an exemplary procedure of reporting failed decoding on PC5 link according to one embodiment of this disclosure.

FIG. 18B illustrates an exemplary procedure of reporting failed decoding on PC5 link according to one embodiment of this disclosure. The embodiment shown in FIG. 18B is for illustration only. Other embodiments could be used without departing from the scope of the present disclosure.

A receiver UE receives the PSCCH and PSSCH on a sidelink channel through PC5 interface 1850. The receiver UE first decodes PSCCH to obtain the resource allocation information for PSSCH and then decodes the PSSCH in 1860. The receiver UE can also calculate the configuration of feedback channel based on the configuration of PSCCH and obtain the configuration of sequences $\{s_1, s_2\}$ in slot 1860. When the receiver UE does not decode TB in PSSCH correctly in slot 1870, the receiver UE can send sequence $s_2$ on the feedback channel to indicate the transmitter UE that the PSSCH is not decoded correctly. If the receiver UE decodes TB in PSSCH correctly in slot 1880, the receiver UE can send the configured sequence $s_1$ on the configured feedback channel to indicate the transmitter UE that the PSSCH is decoded correctly.

In one embodiment, one receiver UE can be requested to report to the transmitter if the PSSCH or PSCCH is not decoded correctly. The receiver UE can be configured with a feedback channel based on the configuration of one PSCCH. If the receiver UE detects signal power, e.g., PSCCH-RSRP or PSCCH-RSRQ, is above some configured threshold but the receiver UE cannot decode the PSCCH correctly, the receiver UE can send one configured signal/sequence on the configured feedback to indicate the transmitter UE that PSCCH is not decoded correctly. If the receiver UE decodes PSCCH correctly but does not decode the PSSCH scheduled by that PSCCH correctly, the receiver UE can send one configured signal/sequence on the configured feedback to indicate the transmitter UE that PSSCH is not decoded correctly.

In a first method, the UE can be configured with a feedback channel based on the location/configuration of one PSCCH and also a signal s. The UE can also be configured with threshold $\lambda_0$ for PSCCH-RSRP (or PSCCH-RSRQ). The receiver UE can be requested to transmit signal s on the configured feedback channel when one or more of the following conditions are met: The receiver UE measures the PSCCH-RSRP and the measured PSCCH-RSRP is larger than the configured threshold $\lambda_0$. The receiver UE decodes the PSCCH and obtain CRC error; The receiver UE decodes PSCCH correctly and decodes the PSSCH scheduled by that PSCCH with CRC error.

In a second method, the UE can be configured with a first feedback subchannel and a second feedback subchannel based on the location/configuration of one PSCCH and also a signal s. The UE can also be configured with threshold $\lambda_0$ for PSCCH-RSRP (or PSCCH-RSRQ). The receiver UE can be requested to transmit signal s on a first feedback subchannel when the following condition is met: The receiver UE measures the PSCCH-RSRP and the measured PSCCH-RSRP is larger than the configured threshold $\lambda_0$. The receiver UE decodes the PSCCH and obtain a CRC error;

The receiver UE can be requested to transmit signal s on a second feedback subchannel when following conditions are met: The receiver UE decodes PSCCH correctly and decodes the PSSCH scheduled by that PSCCH with a CRC error.

In a third method, the UE can be configured with a feedback channel and two sequences $\{s_1, s_2\}$ for one PSCCH. The UE can also be configured with threshold $\Delta_0$ for PSCCH-RSRP (or PSCCH-RSRQ). The receiver UE can be requested to transmit signal $s_1$ on the configured feedback channel when the following condition is met: The receiver UE measures the PSCCH-RSRP and the measured PSCCH-RSRP is larger than the configured threshold $\Delta_0$. The receiver UE decodes the PSCCH and obtain CRC error;

The receiver UE can be requested to transmit signal $s_2$ on the configured feedback channel when following conditions are met: The receiver UE decodes a PSCCH correctly and decodes the PSSCH scheduled by that PSCCH with a CRC error.

In one embodiment, one receiver UE can be requested to report to the transmitter if the PSSCH or PSCCH is not decoded correctly and if the PSSCH is correctly decoded. The receiver UE can be configured with a feedback channel based on the configuration of one PSCCH. If the receiver UE detects signal power, e.g., PSCCH-RSRP or PSCCH-RSRQ, is above some configured threshold but the receiver UE cannot decode the PSCCH correctly, the receiver UE can send one configured signal/sequence on the configured feedback to indicate the transmitter UE that PSCCH is not decoded correctly. If the receiver UE decodes PSCCH correctly but does not decode the PSSCH scheduled by that PSCCH correctly, the receiver UE can send one configured signal/sequence on the configured feedback to indicate the transmitter UE that PSSCH is not decoded correctly. If the receiver UE decodes PSCCH correctly and decodes the PSSCH scheduled by that PSCCH correctly, the receiver UE can send one configured signal/sequence on the configured feedback to indicate the transmitter UE that PSSCH is decoded correctly.

In a first method, the UE can be configured with a first feedback subchannel and a second feedback subchannel based on the location/configuration of one PSCCH and also a signal s. The UE can also be configured with threshold $\lambda_0$ for PSCCH-RSRP (or PSCCH-RSRQ). The receiver UE can be requested to transmit signal s on a first feedback subchannel when one or more of the following conditions are met: The receiver UE measures the PSCCH-RSRP and the measured PSCCH-RSRP is larger than the configured threshold $\lambda_0$. The receiver UE decodes the PSCCH and obtain CRC error; The receiver UE decodes PSCCH correctly and decodes the PSSCH scheduled by that PSCCH with CRC error.

The receiver UE can be requested to transmit signal s on a second feedback subchannel when following conditions are met: The receiver UE decodes PSCCH correctly and decodes the PSSCH scheduled by that PSCCH correctly.

In a second method, the UE can be configured with a first feedback subchannel, a second feedback subchannel and a third feedback subchannel based on the location/configuration of one PSCCH and also a signal s. The UE can also be configured with threshold $\lambda_0$ for PSCCH-RSRP (or PSCCH-RSRQ). The receiver UE can be requested to transmit signal s on a first feedback subchannel when one or more of the following conditions are met: The receiver UE measures the PSCCH-RSRP and the measured PSCCH-RSRP is larger than the configured threshold $\lambda_0$. The receiver UE decodes the PSCCH and obtain CRC error;

The receiver UE can be requested to transmit signal s on a second feedback subchannel when following conditions are met: The receiver UE decodes PSCCH correctly and decodes the PSSCH scheduled by that PSCCH with CRC error.

The receiver UE can be requested to transmit signal s on a third feedback subchannel when following conditions are met: The receiver UE decodes PSCCH correctly and decodes the PSSCH scheduled by that PSCCH correctly.

In a third method, the UE can be configured with a feedback channel and two sequences $\{s_1, s_2\}$ for one PSCCH. The UE can also be configured with threshold $\lambda_0$ for PSCCH-RSRP (or PSCCH-RSRQ). The receiver UE can be requested to transmit signal $s_1$ on the configured feedback channel when the following condition is met: The receiver UE measures the PSCCH-RSRP and the measured PSCCH-RSRP is larger than the configured threshold $\lambda_0$. The receiver UE decodes the PSCCH and obtain CRC error; The receiver UE decodes PSCCH correctly and decodes the PSSCH scheduled by that PSCCH with CRC error.

The receiver UE can be requested to transmit signal $s_2$ on the configured feedback channel when following conditions are met: The receiver UE decodes PSCCH correctly and correctly decodes the PSSCH scheduled by that PSCCH.

In a forth method, the UE can be configured with a feedback channel and three sequences $\{s_1, s_2, s_3\}$ for one PSCCH. The UE can also be configured with threshold $\lambda_0$ for PSCCH-RSRP (or PSCCH-RSRQ). The receiver UE can be requested to transmit signal $s_1$ on the configured feedback channel when the following condition is met: The receiver UE measures the PSCCH-RSRP and the measured PSCCH-RSRP is larger than the configured threshold $\lambda_0$. The receiver UE decodes the PSCCH and obtain CRC error;

The receiver UE can be requested to transmit signal $s_2$ on the configured feedback channel when following conditions are met: The receiver UE decodes PSCCH correctly and decodes the PSSCH scheduled by that PSCCH with CRC error.

The receiver UE can be requested to transmit signal $s_3$ on the configured feedback channel when following conditions are met: The receiver UE decodes PSCCH correctly and correctly decodes the PSSCH scheduled by that PSCCH.

Re-Transmission Design on Sidelink

In release 14 and 15 LTE V2X, the data transmission on a sidelink channel does not support HARQ. There is no ACK or NACK feedback for a PSSCH transmission. To improve the transmission reliability, re-transmission is one good approach.

A first embodiment of the re-transmission design on a sidelink channel can include mechanisms that a UE can be requested to select on transmission identification index from a configured pool of transmission identification index for the transmission and retransmission on a sidelink. The term 'transmission identification index' can be called process ID, HARQ process ID, UE ID, UE temporary ID, temp RNTI, sequence index, transmission ID, transmission identification number. The term 'transmission identification index' is exemplary and can be substituted with any other names or labels without changing the substance of this disclosure.

Before one transmission on a sidelink channel, one transmitter UE can be requested to select one transmission identification index $p_l$ from a configured transmission identification index pool $\{p_1, p_2, p_3, \ldots, p_L\}$ with $L \geq 1$ transmission identification indices. After selecting one transmission identification index $p_l$, the transmitter UE can be requested to the selected index $p_l$ to identify one transmission and all the re-transmission for the first transmission. In one example, the transmitter UE can be requested to send the selected index $p_l$ in the control signaling, for example SCI format X, in PSCCH for the corresponding transmission and all the re-transmission for the first transmission. The transmitter UE can be requested to release the selected transmission identification index $p_l$ after some transmission condition(s) is met.

In one embodiment, the UE can be requested to select one transmission identification index from the configured pool whenever there is a new PSSCH transmission. The UE can be requested to use the selected transmission identification index for the new transmission and all the re-transmission of one TB (transmission block). When the UE finishes the transmission of one TB, the UE can be requested to release the selected transmission identification index.

In one embodiment, the UE can use one selected transmission identification index on transmission and re-transmission of multiple TBs. After the UE finishes the transmission and re-transmission of one TB, the UE can be requested to keep the selected transmission identification index for the transmission of another TB. The UE can be requested to keep the selected transmission identification index for a give configured time length.

Figure 19:
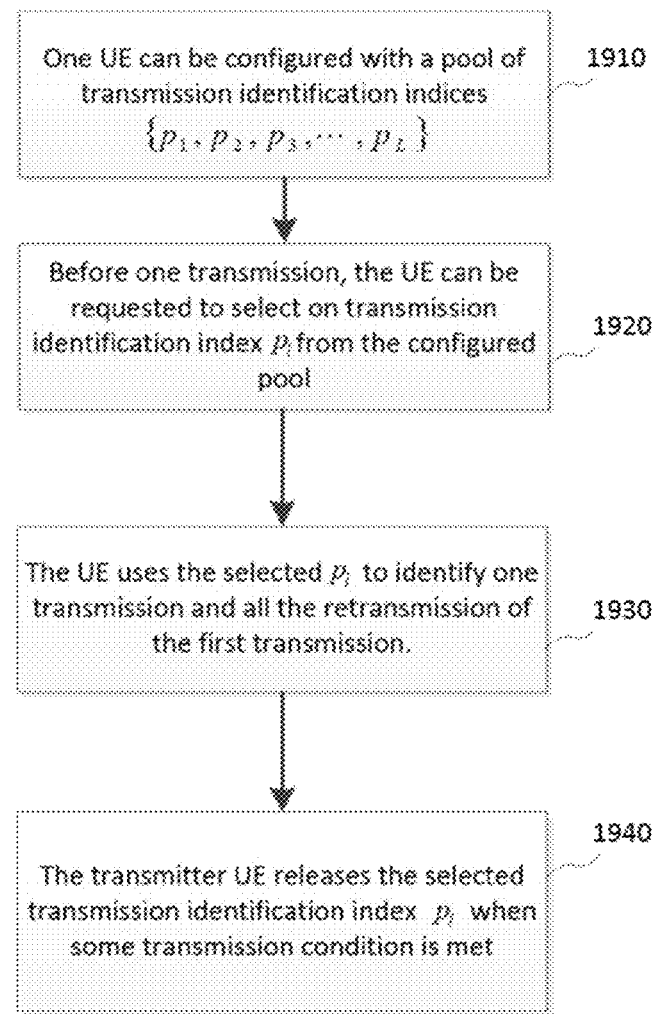
FIG. 19 illustrates an exemplary procedure of selecting and using transmission identification index for a sidelink transmission according to one embodiment of this disclosure.

FIG. 19 illustrates an exemplary procedure of selecting and using a transmission identification index (e.g., HARQ process number) for a sidelink transmission according to one embodiment of this disclosure. The embodiment shown in FIG. 19 is for illustration only. Other embodiments could be used without departing from the scope of the present disclosure.

A UE can be configured with a pool of transmission identification indices (e.g., HARQ process numbers) at operation 1910. A TRP can configure it by high layers to a UE when the UE is under the coverage of a TRP. A UE can be configured through some pre-configuration. When the UE has some packet to transmit on the sidelink, the UE can select one transmission identification index (or one HARQ process number) $p_l$ from the configured pool at operation 1920. Then the UE can use the selected $p_l$ in the transmission and all the re-transmission of the first transmission at operation 1930. When some configured transmission condition is met, the transmitter UE can be requested to release the selected transmission identification index (or the selected HARQ process number) at operation 1940.

In one embodiment, the transmitter UE can be requested to use the selected transmission identification index $p_l$ to identify one transmission and all the re-transmission of the first transmission. This method is useful for the receiver to calculate which a few PSCCH and PSSCH transmissions on the sidelink are the first transmission and re-transmission of one same packet and thus the receiver can calculate how to combine them properly to improve the reliability of reception on the sidelink channel.

In one method, the transmitter UE can be requested to transmit the selected $p_l$ in the SCI format X in PSCCH corresponding to the first transmission and all the re-transmission of one same packet. The SCI format X supporting re-transmission can include one or more of the following parameters 1) to 3).

1) The selected transmission identification index $p_l$.

2) One bit field to indicate the transmission order of one PSSCH. In one example, 2 bits can be used here to indicate the transmission order. Value being 0x00 can indicate that the corresponding PSSCH is one new transmission; Value being 0x01 can indicate that the corresponding PSSCH is first re-transmission; Value being 0x10 can indicate that the corresponding PSSCH is the second re-transmission; Value being 0x11 can indicate that the corresponding PSSCH is the third re-transmission. In one example, 1 bit can be used here to indicate the transmission order. Value being 0x0 can indicate that the corresponding PSSCH is one new transmission; Value being 0x1 can indicate that the corresponding PSSCH is the first re-transmission.

3) Redundancy version indicator to indicate the redundancy version of one PSSCH transmission so that IR re-transmission can be supported.

In one method, the transmitter UE can be requested to use the selected $p_l$ to scramble the SCI format X in PSCCH corresponding to the first transmission and all the re-transmission of one same packet.

Selection Methods

In one embodiment, the UE can be requested to first sense the sidelink to calculate the occupant of transmission identification indices (e.g., HARQ process numbers) and then selected one transmission identification number (e.g., one HARQ process number) from those not used by other transmitter UEs for sidelink transmission. In one method, the UE can be requested to select one transmission identification index based on the following procedure. 1) The UE can be configured with a transmission identification number pool: $\Psi=\{p_1, p_2, p_3, \ldots, p_L\}$. 2) The UE should sense the occupant of transmission identification indices from slot n−1 to slot n−N for a PSSCH new transmission at slot n+M. 3) The UE can be requested to decode all the PSCCH transmitted during slots n−N to n−1. 4) The UE can be requested to pick out all the transmission identification numbers that are used by some transmitter UE during slots n−N and n−1 based on the decoded SCI format X sent in PSCCH. Then the UE can obtain a first subset of transmission identification numbers. 5) The UE can be requested to exclude any transmission identification numbers that have finished the maximal allowed re-transmission number from a first subset of transmission identification number, and then group the rest of identification numbers in a first subset into a second subset of identification numbers. 6) The UE can be requested to exclude all the transmission identification numbers in a second subset from the configured pool $\Psi=\{p_1, p_2, p_3, \ldots, p_L\}$. The rest of transmission identification indices not being excluded from $\Psi=\{p_1, p_2, p_3, \ldots, p_L\}$ can be considered as available index for that UE. The UE can select one from available indices for the new PSSCH transmission at slot n+M.

In one embodiment, UE selects one HARQ process number from the pool of available (or remaining) transmission identification numbers (e.g., HARQ process numbers) on a random basis.

In one method, the UE can be requested to one from the available indices based on a sequence generated from the UE's last Q bits in the UE's upper layer address, for example MAC address.

Figure 20:
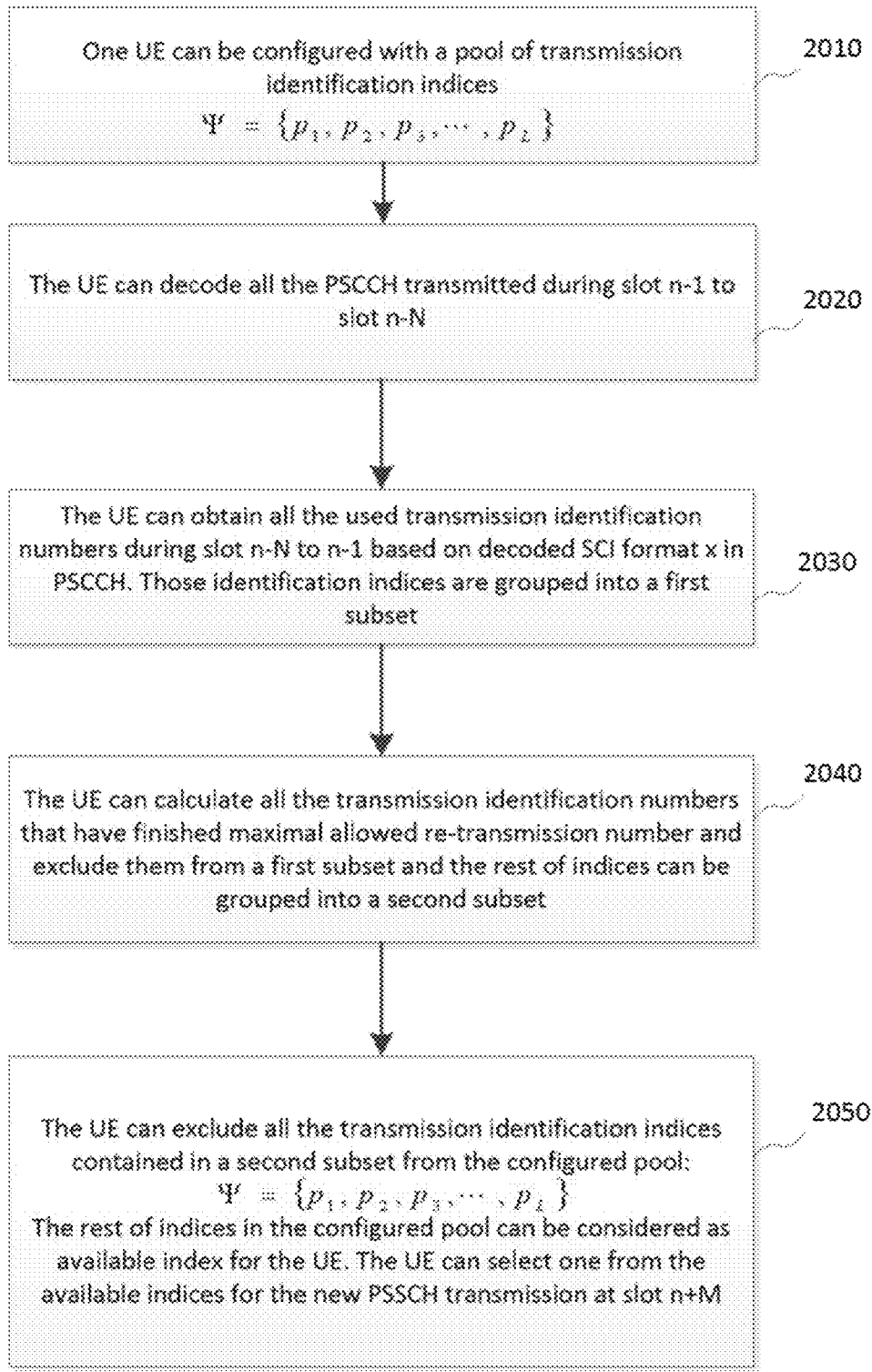
FIG. 20 illustrates an exemplary procedure of sensing and selecting a transmission identification index for a channel transmission according to one embodiment of this disclosure.

FIG. 20 illustrates an exemplary procedure of sensing and selecting a transmission identification index (e.g., HARQ process number) for a sidelink transmission according to one embodiment of this disclosure. The embodiment shown in FIG. 20 is for illustration only. Other embodiments could be used without departing from the scope of the present disclosure.

One UE can be configured with a pool of transmission identification indices $\Psi=\{p_1, p_2, p_3, \ldots, p_L\}$ at slot 2010. The UE can be requested to select on index from the configured pool for a new PSSCH transmission and all the re-transmission for that transmission. Before the UE can select on index, the UE can be requested to first sense the sidelink channel and find out which transmission identification indices has been occupied by other transmitter UEs on the same sidelink channel. The UE can decode all the PSCCH transmitted during slot n−N and slot n−1 at 2020. Then the UE can calculate all the transmission identification indices that are used during slot n−N and slot n−1 based on the decoded SCI format X sent in all PSCCHs transmitted during slot n−N and slot n−1 at 2030. Those used transmission identification indices can be grouped into a first subset. The UE can calculate all the transmission identification indices that completed the maximal allowed re-transmission number during slot n−N and slot n−1. The UE can be requested to exclude all the used transmission identification indices that have completed the maximal allowed re-transmission numbers from a first subset at slot 2040. The rest of indices in a first subset can be grouped into a second subset. Then the UE can exclude all the transmission identification indices (e.g., HARQ process numbers) contained in a second subset from the configured pool at slot 2050, and the rest of the transmission identification indices in the configured pool can be considered as available indices for that UE. The UE can be requested to select one transmission identification index from the available indices based on some configured or pre-configured method at slot 2050.

In one embodiment, a UE can be requested to broadcast its select transmission identification index periodically every T ms.

Release

In one method, the transmitter UE can be configured to release the selected transmission identification index $p_I$ after some transmission condition(s) is met. In one example, the transmitter UE can be configured to release the selected transmission identification index $p_I$ after the maximal allowed number of re-transmissions is achieved. In one example, the transmitter UE can be configured to release the selected transmission identification index $p_I$ when a timer TO for occupying the selected $p_I$ is expired. In one example, the transmitter UE can be configured to release the selected transmission identification index $p_I$ when a timer TO for occupying the selected $p_I$ is expired or the maximal allowed number of re-transmissions is achieved.

Collision Avoidance

After the UE has selected on transmission identification index $p_I$, the UE can be requested to monitor if the same transmission identification index $p_I$ is used by other transmission on a sidelink channel. Assume the UE begin to use transmission identification index $p_I$ for a new PSSCH transmission at slot n. If the UE A can detect the transmission identification index $p_I$ is used by another UE B on a sidelink channel at slot n+k. If the transmission by that UE B using the same index $p_I$ has achieved more re-transmission numbers than the transmission of UE A, the UE A can be requested to release the selection of transmission identification index $p_I$ immediately.

Flexible Repeated Transmission Design for Sidelink

In some embodiment, the transmitter UE can be configured to dynamically select the re-transmission number of one TB transmission on sidelink. In the control signaling, SCI format X, the transmitter UE can indicate one or more of the following information: the total number of transmissions, including the initial transmission and all the re-transmission; the total number of re-transmission; the index of re-transmission. It can be used to indicate the corresponding PSSCH is the $1^{st}$, $2^{nd}$, $3^{rd}$ . . . re-transmission.

In one method, the same encoded bits and symbols can be repeated in all the re-transmission on sidelink.

In one method, different redundancy version can be sent in each re-transmission. In one example, the SCI format X can indicate the redundancy version in the corresponding PSSCH scheduled by that SCI format X. In on example, the redundancy version can be configured based on the re-transmission order and a redundancy version is pre-defined for each transmission, including the initial transmission and all re-transmission. In one example, the redundancy version for the initial transmission can be signaled by the corresponding SCI format X that schedules that PSSCH and the redundancy version for the following re-transmission can be calculated based on the order of re-transmission and the redundancy version used in the initial transmission.

System Schedules Transmission on Sidelink

For the UE in the coverage of systems, the transmission on sidelink can be scheduled by the system. Such a scheduling method can effectively avoid the transmission collision and increase the resource efficiency due to central coordination in one gNB.

In one embodiment, a gNB can configure a UE to transmission on a sidelink though some downlink signaling and the following parameters can be configured to the UE for the transmission of sidelink: A Transmission identification index, or called HARQ process number or HARQ process index, $N_q$; A number for the maximal number of retransmission, $M_q$; Time gap between two adjacent transmission/retransmission.

In one method, a gNB can send a downlink control information DCI format X to schedule a transmission on sidelink. That DCI format X can signal a HARQ process number $N_q$ to the UE for the scheduled transmission on sidelink. That DCI format X can also signal a number for the maximal number of retransmissions $M_q$ to the UE for the scheduled transmission on the sidelink. In another example, the number of maximal number of retransmissions can be configured through higher layer signaling (for example RRC or MAC-CE) and the HARQ process number can be signaled dynamically in DCI format X for each scheduled transmission on sidelink. In one method, when a UE receive a DCI format X that schedules transmission on sidelink, the UE can be requested to apply the HARQ process number indicated in the scheduling DCI format X to the transmission on sidelink.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an example embodiment, various changes and modifications may be suggested to one skilled in the art. It is intended that the present disclosure encompass such changes and modifications as fall within the scope of the appended claims.

What is claimed:

1. A method of operating a user equipment (UE) in a wireless communication, the method comprising:
   receiving a sidelink packet and a sidelink control information (SCI) including a hybrid automatic repeat request (HARQ) process number via a sidelink channel from another UE;
   decoding the received sidelink packet;
   identifying whether the received sidelink packet is successfully decoded or not;
   based on identifying that the received sidelink packet is not successfully decoded, generating a non-acknowledgement (NACK) feedback corresponding to the received sidelink packet and transmitting the NACK feedback via a first sub-channel; and
   based on identifying that the received sidelink packet is successfully decoded, not feeding back acknowledgement (ACK) feedback corresponding to the received sidelink packet via the first sub-channel.

2. The method of claim 1, further comprising based on identifying that the received sidelink packet is successfully decoded, not feeding back the ACK feedback corresponding to the received sidelink packet at all.

3. The method of claim 1, further comprising based on identifying that the received sidelink packet is successfully decoded, the controller is further configured to transmit the ACK feedback via a second sub-channel.

4. The method of claim 1, further comprising determining whether the received sidelink packet is a re-transmission of a previous sidelink packet or a new sidelink packet based at least in part on the HARQ process number.

5. The method of claim 1, wherein:
the UE transmits the NACK feedback or performs no transmission in a feedback channel and does not transmit the ACK feedback in the feedback channel, and
the feedback channel includes the first sub-channel.

6. The method of claim 1, wherein when the reception on the sidelink is from a multi-cast or broadcast transmission to a plurality of UEs, the UE:
transmits the NACK feedback or performs no transmission in the first sub-channel, and
transmits the ACK feedback or performs no transmission in a second sub-channel.

7. A user equipment (UE) in a wireless communication, the UE comprising:
a transceiver configured to receive a sidelink packet and a sidelink control information (SCI) including a hybrid automatic repeat request (HARQ) process number via a sidelink channel from another UE; and
a controller configured to:
decode the received sidelink packet;
identify whether the received sidelink packet is successfully decoded or not;
based on identifying that the received sidelink packet is not successfully decoded, generate a non-acknowledgement (NACK) feedback corresponding to the received sidelink packet and transmit, via the transceiver, the NACK feedback via a first sub-channel; and
based on identifying that the received sidelink packet is successfully decoded, not feedback acknowledgement (ACK) feedback corresponding to the received sidelink packet via the first sub-channel.

8. The UE of claim 7, wherein, based on identifying that the received sidelink packet is successfully decoded, the controller is further configured to not feedback the ACK feedback corresponding to the received sidelink packet at all.

9. The UE of claim 7, wherein, based on identifying that the received sidelink packet is successfully decoded, the controller is further configured to transmit the ACK feedback via a second sub-channel.

10. The UE of claim 7, wherein the HARQ process number is selected from the remaining HARQ process numbers in a configured pool that are not occupied by other UEs.

11. The UE of claim 7, wherein:
the transceiver is further configured to transmit the NACK feedback or perform no transmission in a feedback channel and not transmit the ACK feedback in the feedback channel, and
the feedback channel includes the first sub-channel.

12. The UE of claim 7, wherein, when the reception on the sidelink channel is from a multi-cast or broadcast transmission to a plurality of UEs, the transceiver is further configured to:
transmit the NACK feedback or perform no transmission in the first sub-channel, and
transmit the ACK feedback or perform no transmission in a second sub-channel.

13. The UE of claim 7, wherein the controller is further configured to determine whether the received sidelink packet is a re-transmission of a previous sidelink packet or a new sidelink packet based at least in part on the HARQ process number.

14. A user equipment (UE) in a wireless communication, the UE comprising:
a controller configured to generate a sidelink packet and a sidelink control information (SCI) including a hybrid automatic repeat request (HARQ) process number; and
a transceiver configured to:
transmit the sidelink packet and the SCI via a sidelink channel to another UE; and
receive, via a first sub-channel, a non-acknowledgement (NACK) feedback corresponding to the transmitted sidelink packet if the transmitted sidelink packet was not successfully decoded at the other UE,
wherein the controller is configured to not expect receipt of acknowledgement (ACK) feedback corresponding to the transmitted sidelink packet via the first sub-channel at the UE if the transmitted sidelink packet was successfully decoded at the other UE.

15. The UE of claim 14, wherein, if the transmitted sidelink packet was successfully decoded at the other UE, the controller is further configured to not expect receipt of acknowledgement (ACK) feedback corresponding to the transmitted sidelink packet at the UE at all.

16. The UE of claim 14, wherein, if the transmitted sidelink packet was successfully decoded at the other UE, the transceiver is further configured to receive the ACK feedback via a second sub-channel.

17. The UE of claim 14, wherein the controller is further configured to select the HARQ process number from the remaining HARQ process numbers in a configured pool that are not occupied by other UEs.

18. The UE of claim 14, wherein:
the controller is further configured to expect only one of the NACK feedback or no transmission in a feedback channel and not to expect the ACK feedback in the feedback channel, and
the feedback channel includes the first sub-channel.

19. The UE of claim 14, wherein, when the transmission on the sidelink channel is from a multi-cast or broadcast transmission to a plurality of UEs, the controller is further configured to:
expect only one of the NACK feedback or no transmission in the first sub-channel, and
expect only one of the ACK feedback or no transmission in a second sub-channel.

20. The UE of claim 14, wherein the HARQ process number at least in part indicates whether the transmitted sidelink packet is a re-transmission of a previous sidelink packet or a new sidelink packet.

* * * * *